US012809500B2

(12) United States Patent
Choi et al.

(10) Patent No.: US 12,809,500 B2

(45) Date of Patent: Nov. 24, 2026

(54) ELECTRONIC DEVICE, METHOD, AND COMPUTER-READABLE STORAGE MEDIUM FOR MANAGING STORAGE SPACE OF MEMORY

(71) Applicant: SAMSUNG ELECTRONICS CO., LTD., Suwon-si (KR)

(72) Inventors: Soobin Choi, Suwon-si (KR); Junho Kim, Suwon-si (KR); Yeop Hwangbo, Suwon-si (KR); Yonggil Han, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 227 days.

(21) Appl. No.: 18/741,087

(22) Filed: Jun. 12, 2024

(65) Prior Publication Data

US 2025/0013355 A1 Jan. 9, 2025

Related U.S. Application Data

(63) Continuation of application No. PCT/KR2024/005188, filed on Apr. 17, 2024.

(30) Foreign Application Priority Data

Jul. 7, 2023 (KR) ........................ 10-2023-0088712
Jul. 19, 2023 (KR) ........................ 10-2023-0094199

(51) Int. Cl.
*G06F 3/0484* (2022.01)
*G06F 3/0482* (2013.01)
*G06F 12/02* (2006.01)

(52) U.S. Cl.
CPC .......... *G06F 3/0484* (2013.01); *G06F 3/0482* (2013.01); *G06F 12/0223* (2013.01)

(58) Field of Classification Search
CPC ... G06F 3/0484; G06F 3/0482; G06F 12/0223
See application file for complete search history.

(56) References Cited

U.S. PATENT DOCUMENTS 11,297,025 B2 4/2022 Lee et al.
2007/0050853 A1 3/2007 Rhim
(Continued)

FOREIGN PATENT DOCUMENTS

CN 110543451 A 12/2019
CN 113612791 A 11/2021
(Continued)

OTHER PUBLICATIONS

Written Opinion and International Search Report mailed Aug. 13, 2024 for PCT/KR2024/005188, citing the above reference(s).

*Primary Examiner* — Daniel Samwel
(74) *Attorney, Agent, or Firm* — CANTOR COLBURN LLP

(57) ABSTRACT

A processor according to an embodiment is configured to display a first visual object of visual objects arranged according to an order of variance of sizes of the groups corresponding to a plurality of files, in an area of a first screen for managing memory. The visual objects respectively correspond to the groups of the plurality of files stored in the memory. The processor is configured to, based on an input of the first visual object, display a second screen including a list of first files corresponding to a specified condition of a first group corresponding to the first visual object and a visual element for removal of the first files.

20 Claims, 13 Drawing Sheets

(56) References Cited

U.S. PATENT DOCUMENTS

| | | | | |
|---|---|---|---|---|
| 2010/0048178 | A1* | 2/2010 | Song | H04M 1/72436 455/412.1 |
| 2011/0134738 | A1* | 6/2011 | Pugsley | G11B 27/034 369/84 |
| 2014/0233923 | A1* | 8/2014 | Bradley | H04N 21/485 386/298 |
| 2015/0019418 | A1* | 1/2015 | Hotard | G06Q 20/3226 705/41 |
| 2015/0134913 | A1* | 5/2015 | Huang | G06F 12/0833 711/135 |
| 2015/0244971 | A1* | 8/2015 | Wickenkamp | H04N 5/91 386/295 |
| 2016/0004406 | A1 | 1/2016 | Kang et al. | |
| 2017/0357453 | A1* | 12/2017 | Ko | G06F 3/0608 |
| 2018/0067963 | A1 | 3/2018 | Islam et al. | |
| 2022/0283857 | A1* | 9/2022 | Mese | G06F 9/505 |
| 2022/0385705 | A1* | 12/2022 | Piao | H04L 67/306 |
| 2024/0402888 | A1* | 12/2024 | Ryu | H04L 41/0803 |

FOREIGN PATENT DOCUMENTS

| | | | |
|---|---|---|---|
| JP | 2006171938 | A | 6/2006 |
| JP | 6111734 | B2 | 4/2017 |
| KR | 100736042 | B1 | 7/2007 |
| KR | 20150134927 | A | 12/2015 |
| KR | 20160004590 | A | 1/2016 |
| KR | 101694358 | B1 | 1/2017 |
| KR | 20220139684 | A | 10/2022 |
| KR | 102527896 | B1 | 5/2023 |
| WO | 2004061605 | A2 | 7/2004 |

* cited by examiner

ELECTRONIC DEVICE, METHOD, AND COMPUTER-READABLE STORAGE MEDIUM FOR MANAGING STORAGE SPACE OF MEMORY

CROSS-REFERENCE TO RELATED APPLICATION(S)

This application is a continuation application, claiming priority under § 365 (c), of International Application No. PCT/KR2024/005188, filed on Apr. 17, 2024, which is based on and claims the benefit of a Korean patent application number 10-2023-0094199, filed on Jul. 19, 2023, in the Korean Intellectual Property Office, and of a Korean patent application number 10-2023-0088712, filed on Jul. 7, 2023, in the Korean Intellectual Property Office, the disclosure of each of which is incorporated by reference herein in its entirety.

TECHNICAL FIELD

The present disclosure relates to an electronic device, a method, and a computer-readable storage medium for managing a storage space of memory.

BACKGROUND

Recently, distribution of various types of portable electronic devices such as a smartphone, a tablet PC, a wireless earphone, a smart watch, and the like is expanding. Such a portable electronic device may include a storage device for storing data. The storage device may include a hard disk drive (HDD), a solid state drive (SSD), a memory card, semiconductor memory, and/or non-volatile memory.

SUMMARY

In an electronic device according to an embodiment, the electronic device may comprise a display, memory comprising one or more storage mediums and storing instructions, and at least one processor comprising processing circuitry. The instructions, when executed by the at least one processor individually or collectively, may cause the electronic device to display a first visual object among visual objects arranged according to an order of variance of sizes of the groups corresponding to a plurality of files, in an area of a first screen for managing the memory. The visual objects are respectively corresponding to the groups of the plurality of files stored in the memory. The instructions that, when executed by the at least one processor individually or collectively, may cause the electronic device to, based on an input of the first visual object, display a second screen including a list of first files corresponding to a specified condition of a first group corresponding to the first visual object and a visual element for removal of the first files.

In a method of an electronic device according to an embodiment, the method may comprise displaying a first visual object among visual objects arranged according to an order of variance of sizes of the groups corresponding to a plurality of files, in an area of a first screen for managing memory. The visual objects are respectively corresponding to the groups of the plurality of files stored in the memory. The method may comprise, based on an input of the first visual object, displaying a second screen including a list of first files corresponding to a specified condition of a first group corresponding to the first visual object and a visual element for removal of the first files.

In a computer-readable storage medium storing one or more programs according to an embodiment, the one or more programs, when executed by a processor of an electronic device, may be configured to cause the electronic device to display a first visual object among visual objects arranged according to an order of variance of sizes of groups of a plurality of files, in an area of a first screen for managing the memory. The visual objects are respectively corresponding to the groups of the plurality of files stored in the memory. The one or more programs, when executed by the processor of the electronic device, may be configured to cause the electronic device to, based on an input of the first visual object, display a second screen including a list of first files corresponding to a specified condition of a first group corresponding to the first visual object and a visual element for removal of the first files.

In an electronic device according to an embodiment, the electronic device may comprise a display, memory comprising one or more storage mediums and storing instructions, and at least one processor comprising processing circuitry. The instructions, when executed by the at least one processor individually or collectively, may cause the electronic device to display a first visual object among visual objects of a plurality of files in an area of the first screen for managing the memory. The visual objects may respectively correspond to the groups of the plurality of files stored in the memory and include the first visual object for a file related to installation of software application and a second visual object for a file related to capturing a screen of the electronic device. The instructions, when executed by the at least one processor individually or collectively, may cause the electronic device to display a second screen including a visual element for deleting a first files and a list of the first files that are in the same file path as the file related to the installation corresponding to the first visual object, have the same type as the file related to the installation, and have been created after a specified date, based on the input to the first visual object.

DETAILED DESCRIPTION

Hereinafter, various embodiments of the present document will be described with reference to the accompanying drawings.

Figure 1:
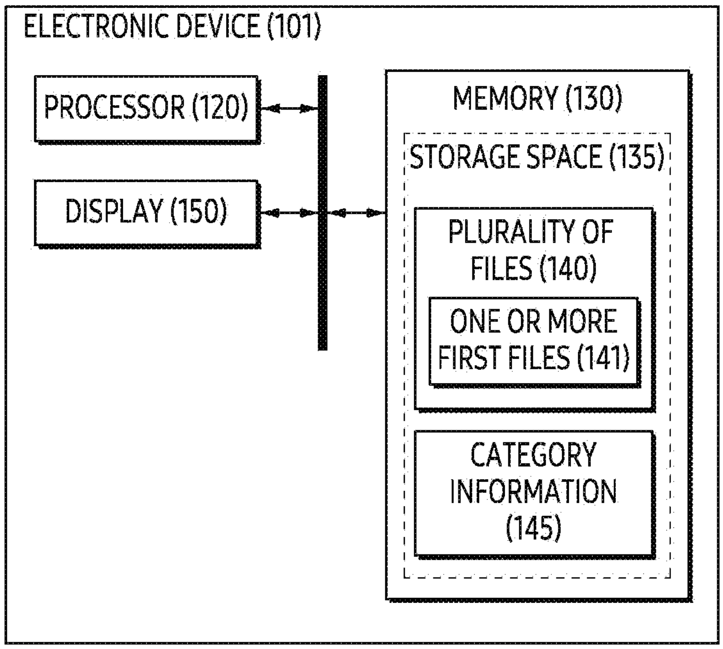
FIG. 1 illustrates an example of a block diagram of an electronic device according to an embodiment.

FIG. 1 illustrates an example of a block diagram of an electronic device according to an embodiment. In an embodiment, in terms of being owned by a user, an electronic device 101 may be referred to as a terminal (or a user terminal). The terminal may include, for example, a personal computer (PC), such as a laptop and a desktop. The terminal may include, for example, a smartphone, a smart pad, and/or a tablet PC. The terminal may include a smart accessory such as a smartwatch and/or a head-mounted device (HMD). The electronic device 101 of FIG. 1 may include a head-mounted display (HMD) that is wearable on the user's head. In order to provide a user interface (UI) based on virtual reality (VR), augmented reality (AR), and/or mixed reality (MR) to the user wearing the electronic device 101, the electronic device 101 may control a camera and/or a sensor.

Referring to FIG. 1, according to an embodiment, the electronic device 101 may include at least one of a processor 120, memory 130, and a display 150. The processor 120, the memory 130, and the display 150 may be electronically and/or operably coupled with each other by an electronical component such as a communication bus.

In an embodiment, hardware of the electronic device 101 being operably coupled may mean that a direct connection, or an indirect connection between hardware, is established by wire or wirelessly such that second hardware is controlled by first hardware among the hardware. Although illustrated based on different blocks, the embodiment is not limited thereto, and a portion (e.g., at least a portion of the processor 120, the memory 130, and the communication circuit (not illustrated)) among the hardware of FIG. 1 may be included in a single integrated circuit such as a system on a chip (SoC). A type and/or number of hardware included in the electronic device 101 is not limited as illustrated in FIG. 1. For example, the electronic device 101 may include only some of a hardware component illustrated in FIG. 1.

According to an embodiment, the processor 120 of the wearable device 101 may include hardware for processing data based on one or more instructions. The hardware for processing data may include, for example, an arithmetic and logic unit (ALU), a floating point unit (FPU), a field programmable gate array (FPGA), a central processing unit (CPU) and/or application processor (AP). The number of the processors 120 may be one or more. For example, the processor 120 may have a structure of a multi-core processor such as a dual core, a quad core, or a hexa core.

According to an embodiment, the memory 130 of the wearable device 101 may include a hardware component for storing data and/or an instruction that is inputted and/or outputted to the processor 120. The memory 130 may include, for example, volatile memory such as random-access memory (RAM) and/or non-volatile memory such as read-only memory (ROM). The volatile memory may include, for example, at least one of dynamic RAM (DRAM), static RAM (SRAM), cache RAM, and pseudo SRAM (PSRAM). The non-volatile memory may include, for example, at least one of programmable ROM (PROM), erasable PROM (EPROM), electrically crasable PROM (EEPROM), flash memory, hard disk, compact disk, solid state drive (SSD) and embedded multimedia card (cMMC).

According to an embodiment, the display 150 of the electronic device 101 may output visualized information to the user. For example, the display 150 may output visualized information to the user, by being controlled by a controller such as a graphic processing unit (GPU). The display 150 may include a liquid crystal display (LCD), a plasma display panel (PDP), and/or one or more light emitting diodes (LEDs). The LED may include an organic LED (OLED). The display 150 may include electronic paper. The display 150 may have at least a partially curved shape or/or a deformable shape.

According to an embodiment, in the memory 130 of the electronic device 101, one or more instructions (or commands) indicating a calculation and/or an operation to be performed by the processor 120 of the electronic device 101 on data may be stored. A set of one or more instructions may be referred to as firmware, operating system, process, routine, sub-routine and/or application. For example, the electronic device 101 and/or the processor 120 may perform at least one of operations of FIG. 8, when a set of a plurality of instructions distributed in a form of an operating system, firmware, driver, and/or application is executed. Hereinafter, the application is installed in the electronic device 101 may mean that the one or more instructions provided in the form of the application are stored in the memory 130, and the one or more applications are stored in an executable format (e.g., a file with an extension specified by the operating system of the electronic device 101) by the processor 120. For example, the application may include a program and/or a library related to a service provided to the user.

The electronic device 101 according to an embodiment may store a plurality of files 140 within capacity of a storage space 135 of the memory 130. The plurality of files 140 may be referred to as data sets in terms of indicating a set of data. The storage space may include a used space (or a used area, usage, etc.) and a free space (or a free area) corresponding to a size of the plurality of files 140. The free space may mean a free space in which another file may be installed, distinct to the plurality of files 140 installed in the memory 130. The size of the plurality of files 140 may mean a size of an area occupied by the plurality of files 140 in the storage space 135. For example, in case that the plurality of files 140 meeting a threshold capacity or more (e.g., about 90% or more of the storage space) are installed in the storage space 135 of the memory 130, the performance of the electronic device 101 may at least temporarily deteriorate. The electronic device 101 may guide the user to delete at least one of the plurality of files 140. An operation in which the electronic device 101 guides the deletion of the at least one of the plurality of files 140 will be described later with reference to FIG. 2.

The electronic device 101 according to an embodiment may classify the plurality of files 140 based on category information 145. The electronic device 101 may classify the plurality of files 140 according to locations where each of the plurality of files 140 is installed. The electronic device 101 may classify the plurality of files 140 according to a format of each of the plurality of files 140. The electronic device 101 may classify the plurality of files 140 according to the time when the plurality of files 140 are installed in the memory 130. The electronic device 101 may classify the plurality of files 140 based on the category information 145, and may identify one or more first files 141 satisfying a specified condition among the classified plurality of files. The one or more first files 141 may include files satisfying the specified condition of each of the categories included in the category information 145. An operation in which the electronic device 101 identifies one or more first files 141 satisfying a specified condition corresponding to the category information 145 will be described later with reference to FIGS. 3A to 3D.

As described above, the electronic device 101 according to an embodiment may provide a user interface for guiding the deletion of at least one file among the plurality of files 140 installed in the memory to the user, in order to secure or increase the storage space of the memory of the electronic device 101. The electronic device 101 may use the category information 145, in order to select at least one file from among the plurality of files 140. The electronic device 101 may provide a service capable of more easily securing or increasing the storage space of the memory of the electronic device 101, by bypassing a selection of files to be deleted by the user, based on selecting at least one file by using the category information 145.

Figure 2:
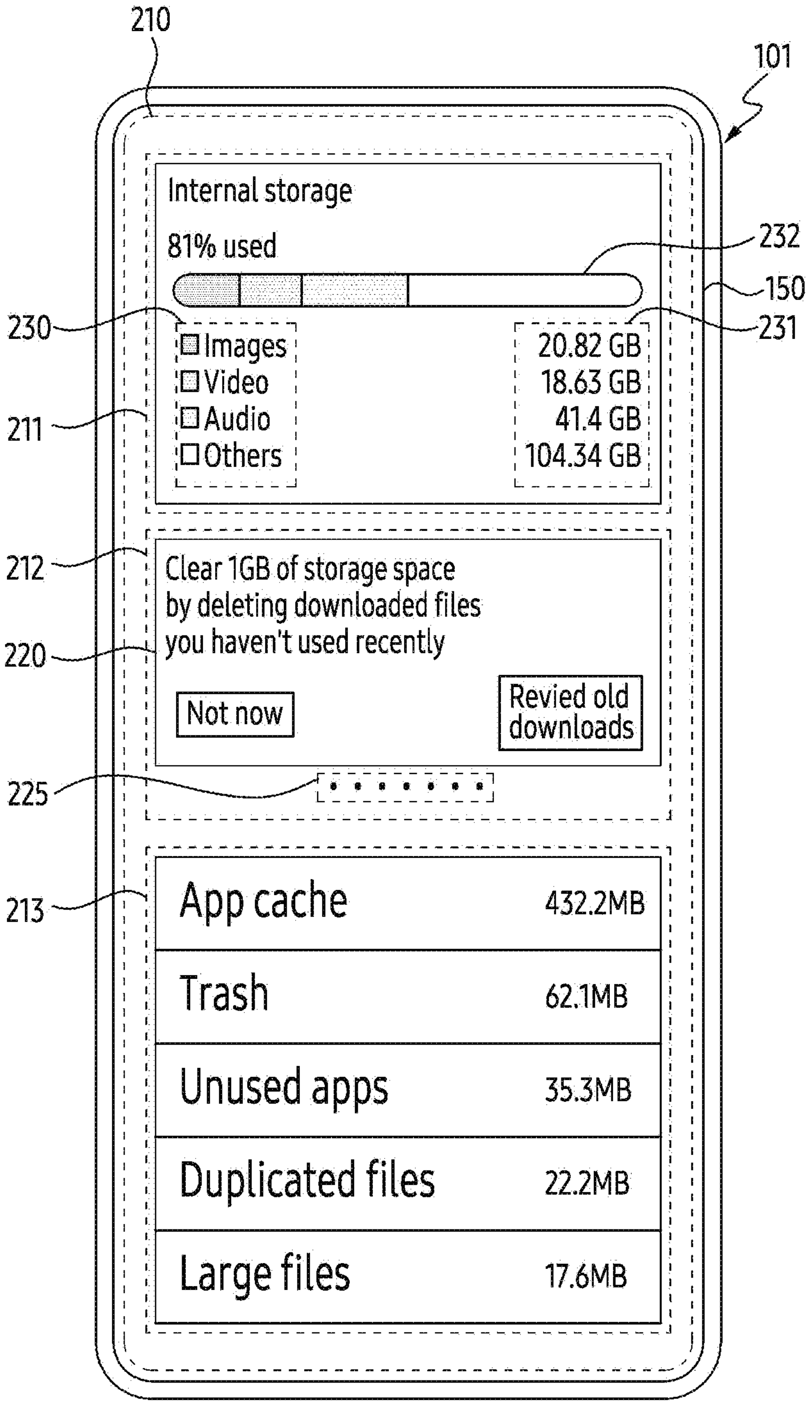
FIG. 2 illustrates an example of a user interface for managing memory of an electronic device according to an embodiment.

FIG. 2 illustrates an example of a user interface for managing memory of an electronic device according to an embodiment. An electronic device 101 of FIG. 2 may include the electronic device 101 of FIG. 1. Referring to FIG. 2, the electronic device 101 according to an embodiment may display a first screen 210 for managing memory on display 150. The first screen 210 may be provided by an operating system installed in the electronic device 101.

For example, the electronic device 101 may display a visual element 232 (or a user interface (UI) element, a view element, and/or a visual object) indicating a storage space, a used space, and/or free space of the memory, text objects 230 indicating a format of files, and/or text objects 231 indicating a size of files classified according to the format, within an area 211 of the first screen 210. For example, the visual element 232 may indicate a ratio between the storage space, the used space, and the free space based on a graph format. A type of graph for indicating the ratio may include a pie graph, a bar graph, and/or a radar chart. However, one or more embodiments are not limited thereto. The visual element 232 may be classified based on the size of each of the files classified according to the format. For example, the electronic device 101 may sort the sizes of the files according to a specified order by using the visual element 232. Although not illustrated, the electronic device 101 may indicate the size of each of the files classified according to the format in an order of relative size such as a smallest to a largest size or a largest to a smallest size, based on the size of each of the files classified according to the format, by using the visual element 232.

For example, although not illustrated, in response to input to each of the text objects 230, the electronic device 101 may display a screen including a list of one or more files classified by a format indicating the text objects 230, on the display. For example, in response to input to each of the text objects 231, the electronic device 101 may display a screen including a list of one or more files classified by a format indicating the text objects 230 corresponding to each of the text objects 231, on the display.

According to an embodiment, the electronic device 101 may identify the ratio between the storage space, the used space, and the free space, based on an input for indicating display of the first screen 210. Based on identifying the ratio, the electronic device 101 may identify a variance of a size of a plurality of files (or groups of a plurality of files) classified based on category information 145 of FIG. 1. For example, visual objects indicating categories corresponding to each of the plurality of classified files may be sequentially displayed in a scrollable area 212 of the first screen 210 according to an order of the variance. An operation in which the electronic device 101 determines an order of the categories according to the order of the variance will be described later with reference to FIG. 4A.

For example, the electronic device 101 may display indicators 225 based on the number of visual objects indicating the categories in the area 212. Each of the indicators 225 may be matched to each of the visual objects. The indicators 225 may be referred to as a pagination object and/or a dot pagination object, in terms of matching with respect to each of the visual objects within the scrollable area 212.

For example, the electronic device 101 may indicate an order of the visual objects by using the indicators 225. While displaying the visual object 220 indicating at least one category among the categories, the electronic device 101 may display, by visually highlighting, a first indicator corresponding to an order of the visual object 220. For example, in order to display, by visually highlighting, the first indicator, the electronic device 101 may display a color of the first indicator differently from a color of another indicator. For example, in order to display, by visually highlighting, the first indicator, the electronic device 101 may display a size of the first indicator relatively larger than a size of the other indicator. However, one or more embodiments are not limited thereto. Since the electronic device 101 displays the indicators 225 based on the number of visual objects, in case that the number of visual objects is changed, the electronic device 101 may adjust the number of indicators 225 based on the changed number. Although a single visual object 220 is depicted as an example in FIG. 2, the number of visual objects within the scrollable area 212 has a one-to-one relationship to the number of indicators 225 according to one or more embodiments. An operation in which the electronic device 101 adjusts the number of the indicators 225 will be described later with reference to FIG. 5.

According to an embodiment, the electronic device 101 may display text objects for classifying a plurality of files stored in the memory in an area 213 of the first screen 210 independently of the category information 145 of FIG. 1. The electronic device 101 may display a text object (e.g., app cache) for indicating cache files temporarily stored in the memory, a text object (e.g., trash) for indicating deleted files, a text object (e.g., unused apps) for indicating software applications that have not been executed for a specified time, a text object (e.g., duplicated files) for indicating the same files, and/or a text object (e.g., large files) for indicating files with relatively large sizes among files stored in memory, in the area 213. The electronic device 101 may display a screen including a list of files corresponding to each of the text objects based on an input to each of the text objects.

According to an embodiment as described above, the electronic device 101 may display visual objects for indicating a plurality of files classified based on category information in the first screen 210 for managing the memory. The electronic device 101 may notify the user of at least one of the plurality of files stored in the memory that satisfies a specified condition corresponding to each of the categories, by using the visual objects. Based on notifying the user of at least one of the plurality of files that satisfies the specified condition, the user may improve usability of the first screen 210 for managing the memory. Hereinafter, categories for classifying the plurality of files stored in the memory by the electronic device 101 and the specified condition corresponding to each of the categories will be described with reference to FIGS. 3A to 3D.

Figure 3A:
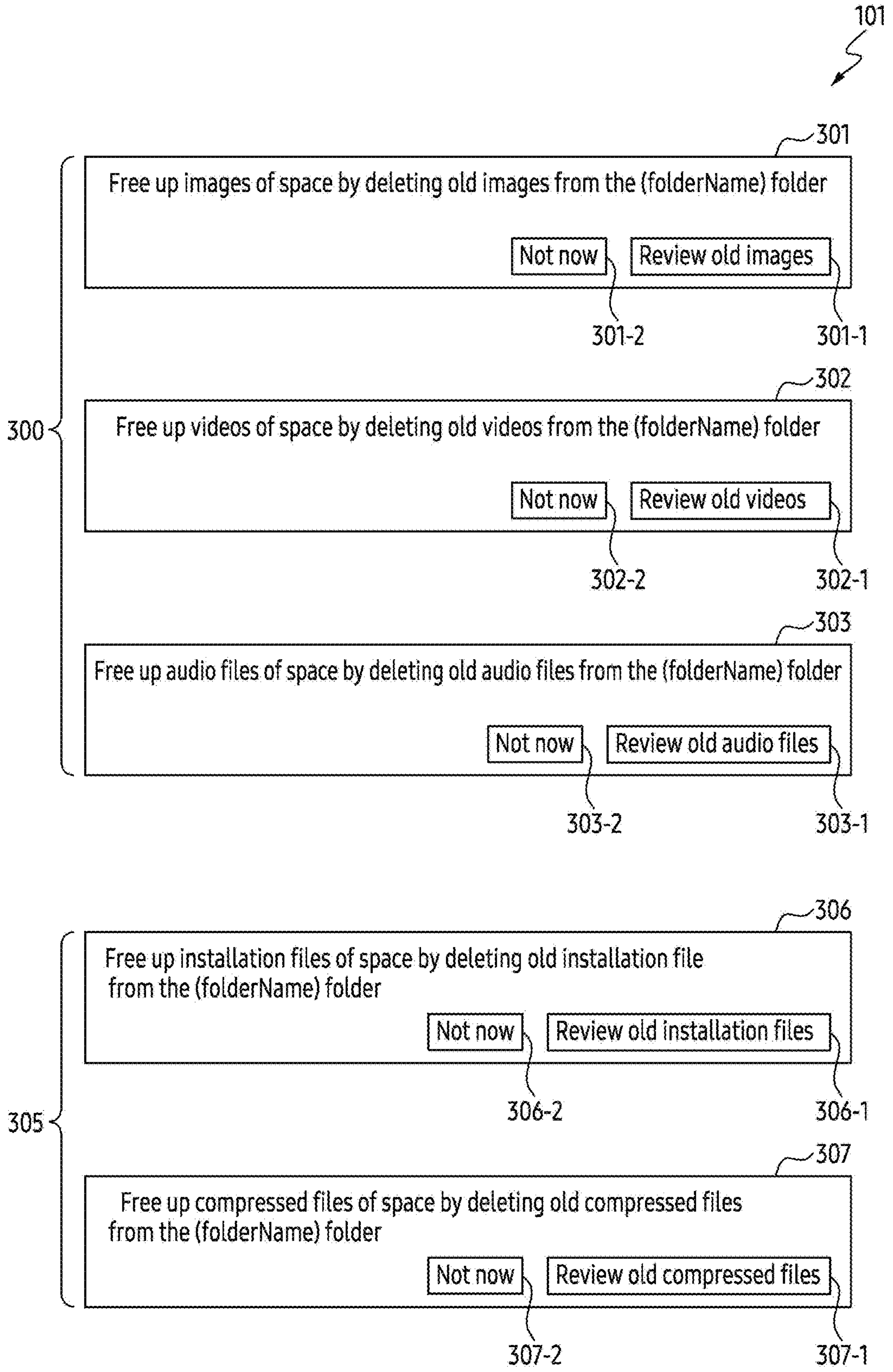
FIGS. 3A, 3B, 3C, and 3D illustrate an example of a visual object indicating categories for classifying files of an electronic device according to an embodiment.
Figure 3B:
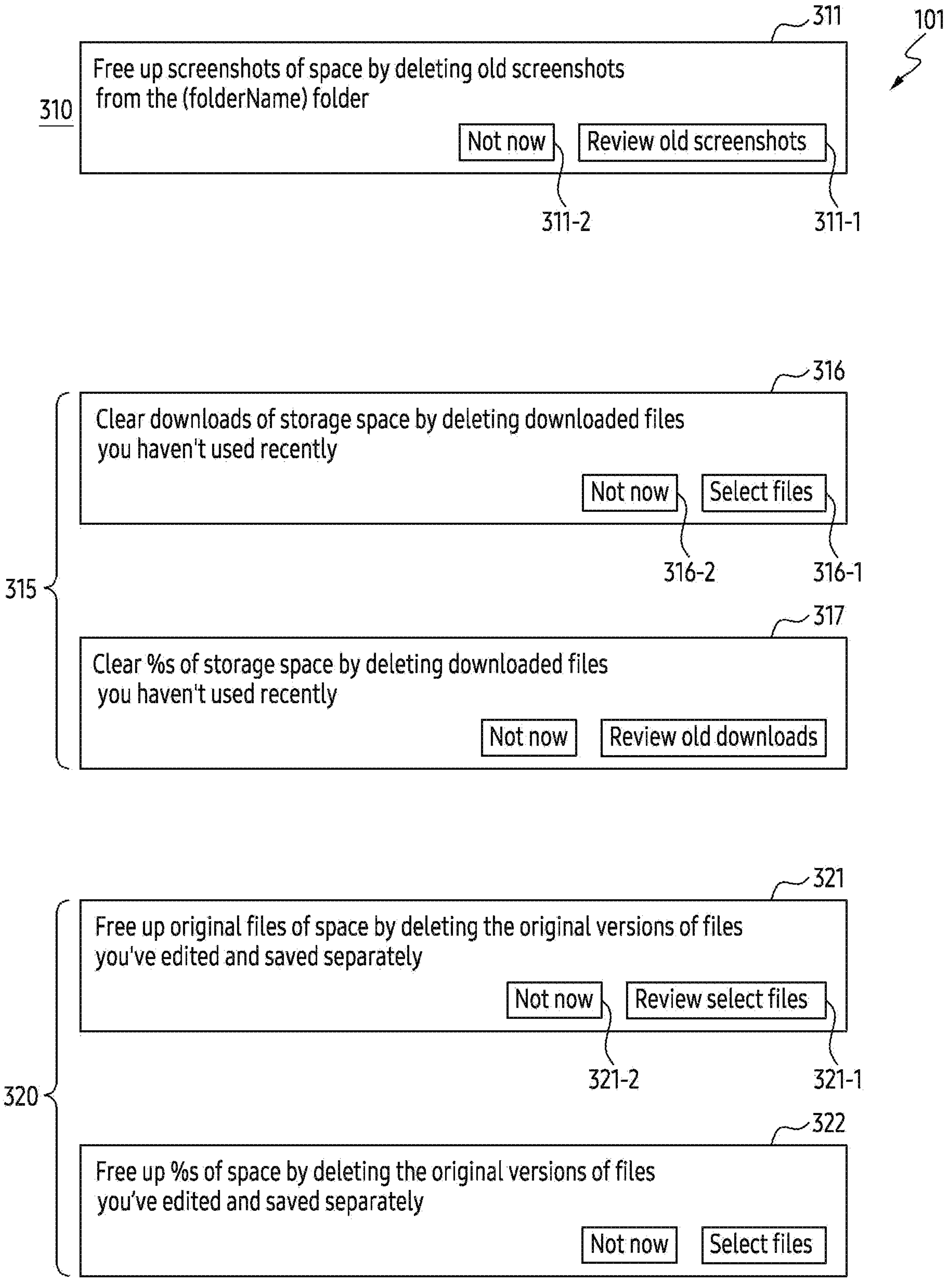
Figure 3C:
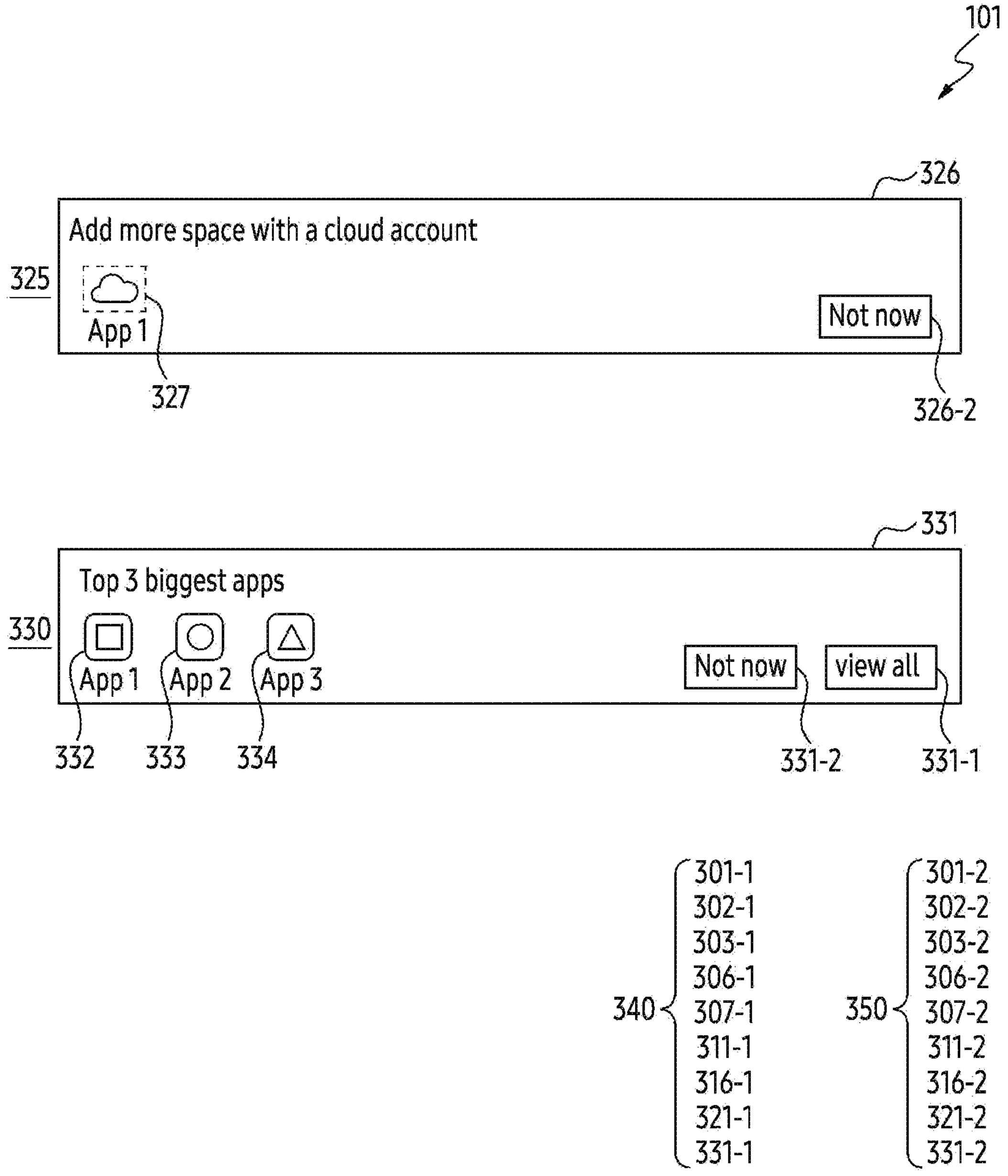

FIGS. 3A to 3C illustrate an example of a visual object indicating categories for classifying files of an electronic device according to an embodiment. An electronic device 101 of FIGS. 3A to 3C may include the electronic device 101 of FIGS. 1 and 2. Referring to FIGS. 3A to 3D, categories 300, 305, 310, 315, 320, 325, and 330 for classifying a plurality of files stored in memory and visual objects indicating categories 300, 305, 310, 315, 320, 325, and 330 respectively are illustrated.

Referring to FIG. 3A, according to an embodiment, the electronic device 101 may identify the first category 300 by using category information (e.g., category information 145 of FIG. 1). The first category 300 may be used to identify files related to media content among the plurality of files (e.g., plurality of files 140 of FIG. 1). For example, the electronic device 101 may identify files having a format such as an image, a video, and/or audio related to the media content among the plurality of files, based on the first category 300. The electronic device 101 may identify one or more files (e.g., one or more first files 141 of FIG. 1) that satisfy a specified condition of the first category 300 among the plurality of files. The specified condition may include one or more conditions.

For example, the electronic device 101 may identify the oldest file among files included in the first category 300 installed in the memory based on the specified condition of the first category 300. The electronic device 101 may identify a format of the oldest file and/or a location where the oldest file is stored. The location where the oldest file is stored may mean a path where the oldest file is stored in the memory of the electronic device 101. The electronic device 101 may identify the location where the oldest file is stored, by using a folder (or directory or catalog) for classifying files. The folder may include another folder and/or one or more files.

For example, the electronic device 101 may identify other files having the same format (or type) as the oldest file within the folder where the oldest file is stored, based on the specified condition. The electronic device 101 may identify files stored after a specified time (e.g., 30 days) (or a specified date) among other files having the same format within the folder. The electronic device 101 may determine the oldest file and files stored after the specified time as files of the first category 300 (e.g., one or more first files 141 of FIG. 1) to be deleted from the memory. For example, in the case that files of the first category 300 are deleted based on a user input, the electronic device 101 may identify files that satisfies the specified condition within another folder distinct to the folder where the oldest file is stored. For example, the electronic device 101 may identify files that satisfy the specified condition within the other folder distinct to the folder where the oldest file is stored, based on a user input for bypassing deletion of the files of the first category 300. However, one or more embodiments are not limited thereto. The electronic device 101 may identify other files having the same format as the old file as the files of the first category 300 to be deleted, by identifying a relatively old file among files installed after the oldest file based on the user input for bypassing the deletion of the files of the first category 300. For example, when the user selects not to delete the old file that has been identified in the first category 300, the electronic device 101 can further display relatively old files among files installed after the oldest file that was not deleted, such that the user can delete one or more of the relatively old files instead.

For example, the electronic device 101 may display the visual objects 301, 302, and 303 indicating the files of the first category 300 in an area (e.g., an area 212 of FIG. 2) of the first screen (e.g., a first screen 210 of FIG. 2) based on determining the files of the first category 300 to be deleted in the memory. The electronic device 101 may display a visual object indicating a specified text within the area, based on the format of the files of the first category 300. The specified text may include a format of the files of the first category 300 or a folder name in which the files of the first category 300 are stored. For example, in the case that the files of the first category 300 are images, the electronic device 101 may generate a visual object 301. In the case that the files of the first category 300 are videos (or moving images), the electronic device 101 may generate a visual object 302. In the case that the files of the first category 300 are audio, the electronic device 101 may generate a visual object 303 to be displayed within the area. In addition, the electronic device 101 may additionally display and generate the entire size of files that may be listed when entering the file folder in the visual object 301.

For example, the visual object 301 may include a text object 301-1 for displaying a list of files of the first category 300 corresponding to the visual object 301, and/or a text object 301-2 for refraining from displaying the visual object 301 within the area. While displaying the visual object 301 in the area (e.g., the area 212 of FIG. 2) of the first screen (e.g., the first screen 210 of FIG. 2), the electronic device 101 may display a second screen (e.g., a second screen 515 of FIG. 5) including the list of files (or one or more images) of the first category 300 corresponding to the visual object 301 on the display in response to an input to the text object 301-1. While displaying the visual object 301 in the area (e.g., the area 212 of FIG. 2) of the first screen (e.g., the first screen 210 of FIG. 2), the electronic device 101 temporarily refrains from displaying the visual object 301 within the area of the first screen, in response to the input to the text object 301-2. In the case that the display of the visual object 301 is temporarily refrained, the electronic device 101 may temporarily refrain from displaying an indicator (e.g., an indicator 225 of FIG. 2) matching the visual object 301. Although not described in detail, the descriptions of a text object 302-1 and a text object 303-1 apply by analogy to the description of the text object 301-1. Similarly, the descriptions of a text object 302-2 and a text object 303-2 apply by analogy to the description of the text object 301-2. Hereinafter, an overlapping description is omitted.

According to an embodiment, the electronic device 101 may classify files having a software application format (e.g., apk) using a second category 305 and files having an encoded compressed files format (e.g., zip) to reduce the size of the file. The electronic device 101 may distinguish files having a different format from the format of files corresponding to the first category 300 by using the second category 305. The electronic device 101 may identify the oldest file among files corresponding to the second category 305 installed in the memory based on a specified condition of the second category 305. The electronic device 101 may identify the format of the oldest file and/or the folder in which the oldest file is stored, based on the specified condition. The electronic device 101 may obtain other files having the same format as the oldest file within the folder in which the oldest file is stored, based on the specified condition. The electronic device 101 may identify files installed in the folder after the specified time (e.g., 30 days) among other files having the same format (e.g., a compressed file format, and/or a software application format). The electronic device 101 may determine the oldest file and files stored after the specified time as one or more files (e.g., one or more first files 141 of FIG. 1) to be deleted in the memory. Hereinafter, among descriptions of the second category 305, a description overlapping with the first category 300 will be omitted.

For example, the electronic device 101 may display visual objects 306 and 307 indicating files of the second category 305 in the area (e.g., the area 212 of FIG. 2) of the first screen (e.g., the first screen 210 of FIG. 2), based on determining the files of the second category 305 to be deleted in the memory. In the case that the files of the second category 305 are a compressed file, the electronic device 101 may generate a visual object 307. The visual object 307 may include a folder name in which the files of the second category 305 are installed, and/or a specified text indicating a format of the files of the second category 305. In the case that the files of the second category 305 are not the compressed file and the media content, the electronic device 101 may generate a visual object 306. The visual object 306 may include specified text including files (e.g., files having a format distinct to the media content) installed in memory and/or a folder name in which the files are stored. For example, the descriptions of a text object 306-1 and a text object 307-1 apply by analogy to the description of the text object 301-1. Similarly, the descriptions of a text object 306-2 and a text object 307-2 apply by analogy to description of the text object 301-2. Hereinafter, an overlapping description is omitted.

Referring to FIG. 3B, a third category 310 may be used to identify images obtained by capturing a screen of an electronic device stored in a specified folder among the plurality of files (e.g., plurality of files 140 of FIG. 1). The electronic device 101 may identify images stored in the specified folder among the plurality of files based on the third category 310. The specified folder may mean a folder for storing at least one of screens displayed on a display of the electronic device 101. The electronic device 101 may store the at least one of the screens in the specified folder in response to an input for capturing at least one of the screens. The at least one of the screens may be referred to as a screen shot image (or screen shot file).

For example, the electronic device 101 may identify files (or images) having a specified file name (e.g., screenshot) among the plurality of files stored in the specified folder, based on the specified condition of the third category 310. The electronic device 101 may identify at least one file stored after a specified period among the files. For example, the electronic device 101 may identify at least one file stored before (or within) the specified period among the files. The at least one file stored before the specified period may include a file stored before the specified period from the present. The electronic device 101 may identify the at least one file as a file of the third category 310 to be deleted in the memory. Based on identifying the file of the third category 310, the electronic device 101 may generate a visual object 311 to be displayed on the area (e.g., the area 212 of FIG. 2) of the first screen (e.g., the first screen 210 of FIG. 2). The visual object 311 may include text indicating the screen shot image and the folder name in which the file of the third category 310 is stored. A description of a text object 311-1 applies by analogy to the description of the text object 301-1. A description of a text object 311-2 applies by analogy to the description of the text object 301-2. The visual object 311 may indicate a file related to capturing the screen.

According to an embodiment, the electronic device 101 may identify a plurality of files (e.g., plurality of files 140 of FIG. 1) stored in a specified folder based on a fourth category 315. The fourth category 315 may be used to identify the plurality of files stored in the specified folder, independently of the format of the files. The specified folder may mean a folder (e.g., download folder) in which files downloaded by the user of the electronic device 101 are stored in the electronic device 101.

For example, the electronic device 101 may identify at least one file stored after the specified period (e.g., 30 days) among files stored in the specified folder based on the specified condition of the fourth category 315. The electronic device 101 may refrain from scanning subfolders stored in the specified folder and/or files stored in the subfolders. However, one or more embodiments are not limited thereto.

For example, the electronic device 101 may generate a visual object 316 to be displayed on the area (e.g., the area 212 of FIG. 2) of the first screen (e.g., the first screen 210 of FIG. 2) based on identifying at least one file stored after the specified period (e.g., 30 days). A description of a text object 316-1 applies by analogy to the description of the text object 301-1. A description of a text object 316-2 applies by analogy to the text object 301-2. For example, based on the specified condition of the fourth category 315, in the case that the at least one file stored after the specified period is identified, a visual object 317 may be generated. The visual object 317 may be substantially similar to the visual object 316. Hereinafter, an overlapping description may be omitted.

According to an embodiment, the electronic device 101 may identify an original file stored in the memory based on a fifth category 320. For example, the electronic device 101 may generate an edited file in which at least a portion of the original file is changed, based on a user input by using the original file. Based on generating the edited file, the electronic device may store the original file corresponding to the edited file in the specified folder. The electronic device 101 may store the original file in the specified folder in order to provide the user with a function for returning the edited file to the original file. The original file may be referred to as a backup file in relation to the edited file.

For example, the electronic device 101 may identify the original file based on a specified condition of the fifth category 320. The electronic device 101 may identify the original file based on the specified condition of the fifth category 320 independently of the period in which the original file was installed. Based on identifying the original file, the electronic device 101 may generate a visual object 321 to be displayed on the area (e.g., the area 212 of FIG. 2) of the first screen (e.g., the first screen 210 of FIG. 2). A description of a text object 321-1 applies by analogy to the description of the text object 301-1. A description of a text object 321-2 applies by analogy to the text object 301-2. The descriptions are omitted of the text object 321-1 and the text object 321-2 that overlap the descriptions of the text object 301-1 and the text object 301-2. For example, the electronic device 101 may identify the original file based on the specified condition of the fifth category 320. Based on identifying the original file, a visual object 322 indicating the original file may be obtained. The visual object 322 may be substantially similar to the visual object 321. Hereinafter, an overlapping description will be omitted. For example, text (e.g., % s) included in the visual object 317 and the visual object 322 may indicate the size of files corresponding to each of the visual objects 317 and 322.

According to an embodiment, the visual objects 301, 302, 303, 306, and 307 of FIG. 3A and the visual objects 311, 316, and 321 of FIG. 3B may further include information indicating the size of at least one file to be deleted. However, one or more embodiments are not limited thereto.

Referring to FIG. 3C, according to an embodiment, the electronic device 101 may generate a visual object 326 to be displayed on the area (e.g., the area 212 of FIG. 2) of the first screen (e.g., the first screen 210 of FIG. 2) based on a specified condition of a sixth category 325. The specified condition of the sixth category 325 may include whether the electronic device 101 is logged in to a software application. The software application may be an example of a software application that provides a service for uploading at least one file installed in the electronic device 101. In the case that the electronic device 101 is logged in to the software application, the electronic device 101 may temporarily refrain from generating the visual object 326. When the electronic device 101 is not logged in to the software application, the electronic device 101 may generate the visual object 326. The visual object 326 may include an icon 327 indicating the software application. For example, the electronic device 101 may initiate executing the software application in response to an input to (or selection of) the icon 327 while displaying the visual object 326 in the area of the first screen. The electronic device 101 may display a screen for logging in to the software application on the display based on the execution of the software application. For example, the electronic device 101 may, in response to an input to a text object 326-2 (e.g., not now) included in the visual object 326, at least temporarily refrain from displaying the visual object 326 while the first screen is displayed on the display. However, one or more embodiments are not limited thereto.

According to an embodiment, the electronic device 101 may compare sizes of each of a plurality of software applications installed in the memory based on a specified condition of a seventh category 330. The electronic device 101 may identify software applications having a relatively large size among the plurality of software applications. For example, the electronic device 101 may select software applications that are relatively large in size based on a specified number (e.g., three). The electronic device 101 may generate a visual object 331, including icons 332, 333, and 334 indicating the selected software applications.

For example, the electronic device 101 may identify an input (or selection) for at least one icon among the icons 332, 333, and 334 while displaying the visual object 331 on the area (e.g., the area 212 of FIG. 2) of the first screen (e.g., the first screen 210 of FIG. 2). Based on the identification of the input for the at least one icon, the electronic device 101 may display a screen indicating information of a software application corresponding to the at least one icon on the display. Using the screen, the electronic device 101 may delete a cache file installed by the software application. However, one or more embodiments are not limited thereto. For example, the electronic device 101 may identify an input to a text object 331-1 (view all) while displaying the visual object 331 on the area (e.g., the area 212 of FIG. 2) of the first screen (e.g., the first screen 210 of FIG. 2). Based on identifying the input to the text object 331-1, the electronic device 101 may display a screen including a list of all of the plurality of software applications installed in the memory on the display. The screen may include information indicating the size of each of the plurality of software applications. In response to an input to a text object 331-2 (e.g., not now) included in the visual object 331, the electronic device 101 may at least temporarily refrain from displaying the visual object 331 while the first screen is displayed on the display.

According to an embodiment, a category used by the electronic device 101 to generate a visual object to be displayed on the area of the first screen is not limited to the above description. For example, the electronic device 101 may classify a plurality of files stored in the memory based on another category distinct to the categories 300, 305, 310, 315, 320, 325 and 330 of FIGS. 3A to 3C. For example, the electronic device 101 may identify a folder that is relatively large in size, by comparing the sizes of folders stored in the memory. The electronic device 101 may generate a visual object for removing the folder that is large in size. For convenience of explanation below, the text objects 301-1, 302-1, 303-1, 306-1, 307-1, 311-1, 316-1, 321-1, 326-1, and 331-1 may be included in the text object 340, and the text objects 301-2, 302-2, 303-2, 306-2, 307-2, 311-2, 316-2, 321-2, 326-2, and 331-2 may be included in the text object 350.

Figure 3D:
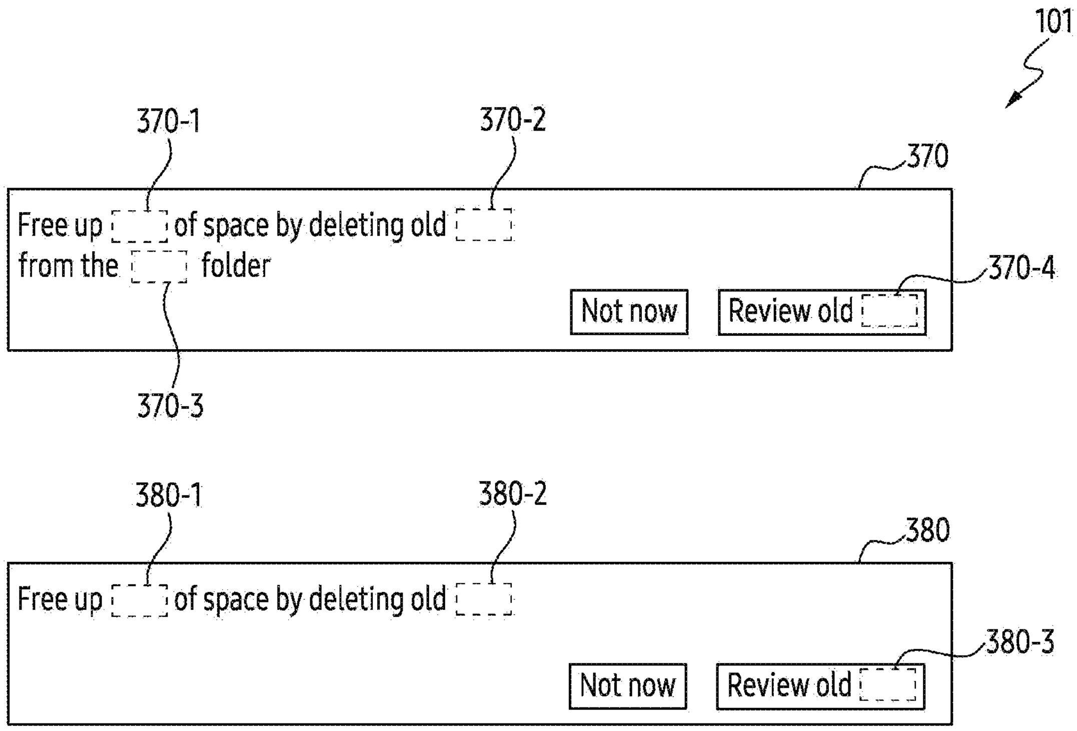

Referring to FIG. 3D, the electronic device 101 according to an embodiment may generate a user interface such as a visual object 370 and/or a visual object 380. For example, the visual object 370 may be generated based on a specified condition corresponding to the first category 300 to the third category 310. A text disposed in an area 370-1 within the visual object 370 may include a size of files corresponding to a specified condition required to generate the visual object. Texts disposed in areas 370-2 and 370-4 within the visual object 370 may indicate a type of files (e.g., an image, audio, video, a screenshot image, and/or a compressed file) corresponding to a specified condition required to generate the visual object. A text 370-3 located in the area within the visual object 370 may indicate a location (e.g., folder name) of files corresponding to a specified condition required to generate the visual object.

For example, the visual object 380 may be obtained in the case that the location of files corresponding to the specified condition is not located in the specified folder (e.g., in the case of a screen shot image, a screen shot storage folder, etc.). A text located in an area 380-1 within the visual object 380 may indicate a size of the files. A text located in areas 380-2 and 380-3 within the visual object 380 may indicate the type of files. However, one or more embodiments are not limited thereto.

According to an embodiment as described above, the electronic device 101 may identify one or more first files (e.g., the one or more first files 141 of FIG. 1) to be deleted from among the plurality of files stored in the memory based on a specified condition of each of the categories 300, 305, 310, 315, 320, 325, and 330. The electronic device 101 may classify a plurality of files stored in the memory in subdivision, by using the categories in order to secure a storage space of the memory.

Hereinafter, referring to FIG. 4A, an example of an operation of determining an order of visual objects (or categories) will be described later in order for the electronic device 101 to preferentially display at least one of the visual objects generated based on each of the categories on the area of the first screen.

Figure 4A:
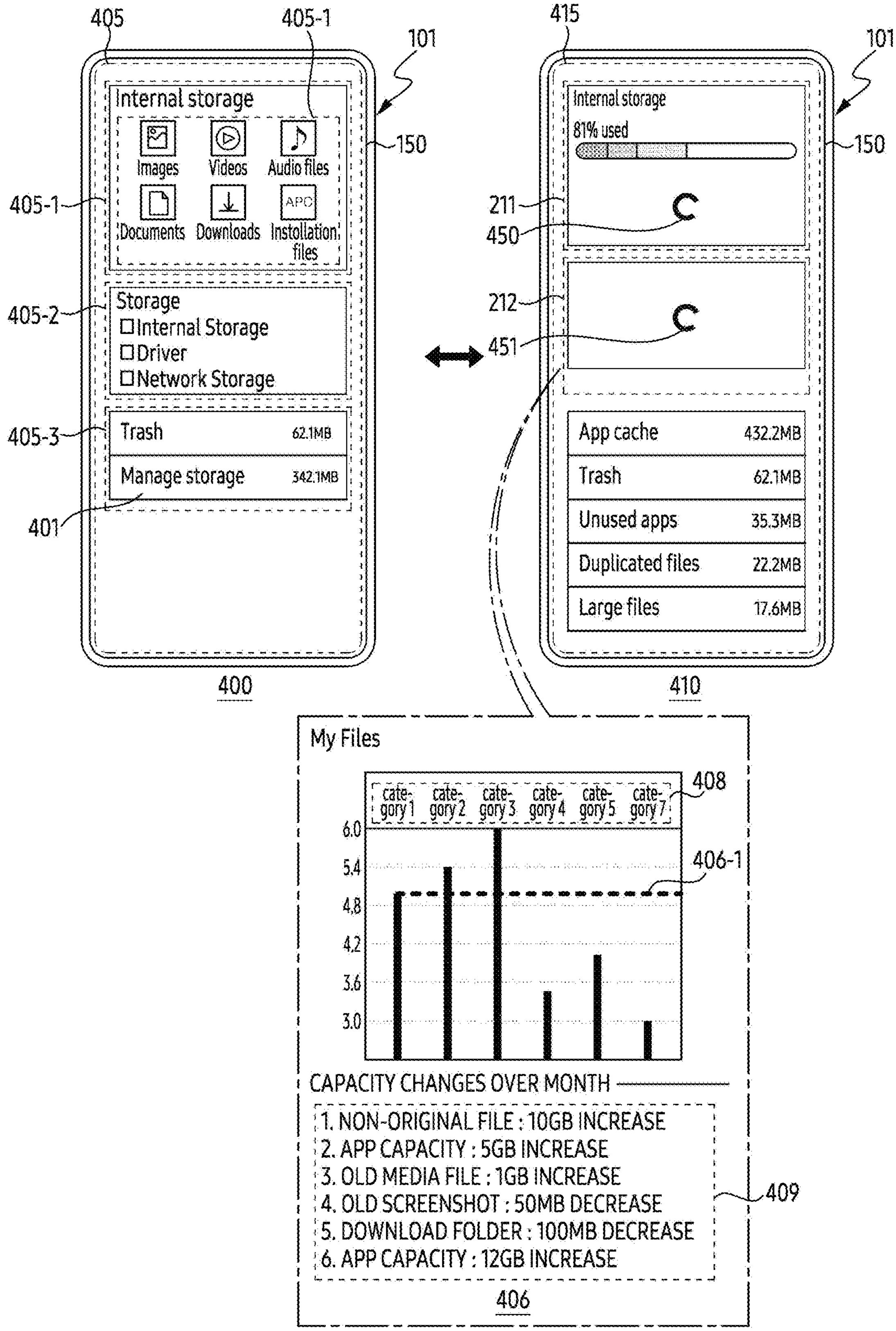
FIGS. 4A and 4B illustrate an example of an operation in which an electronic device displays a visual object in a user interface according to an embodiment.
Figure 4B:
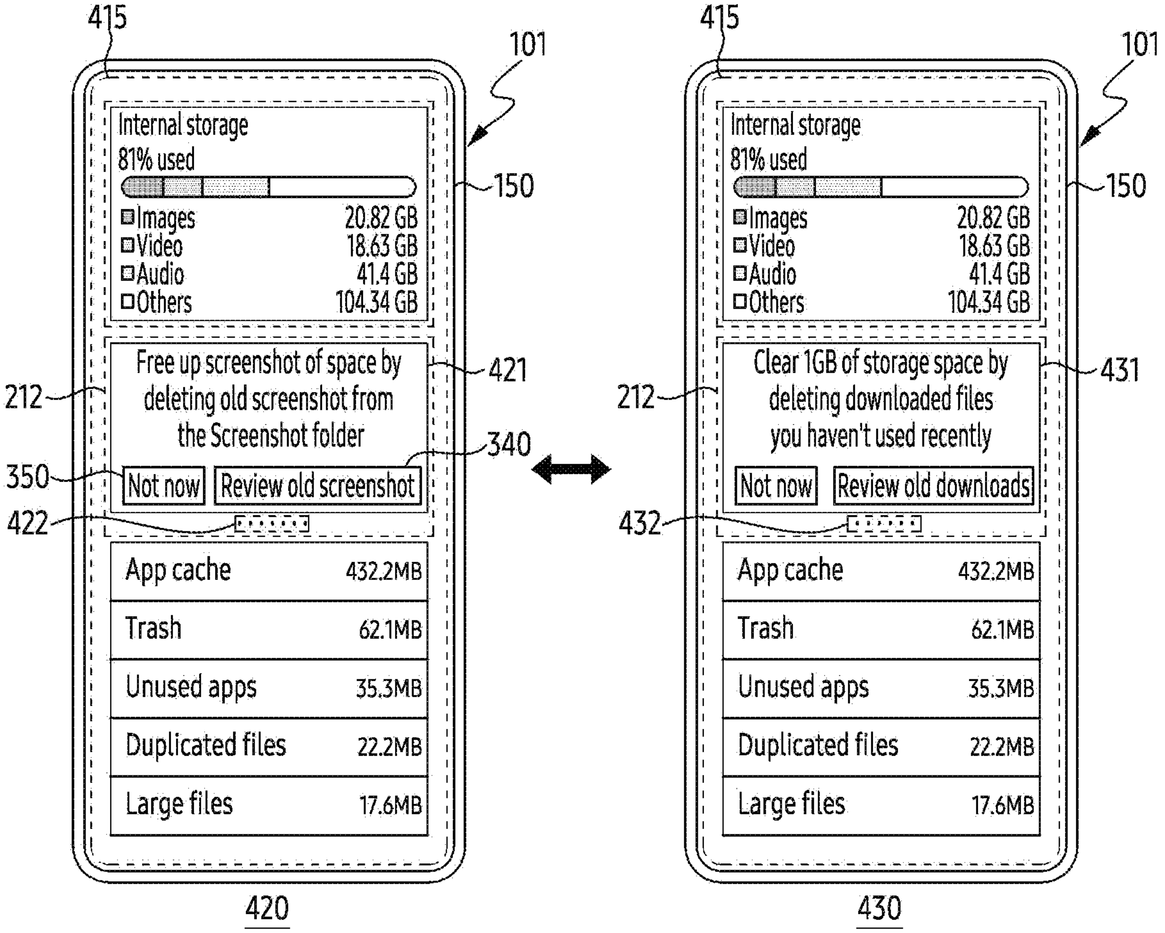

FIGS. 4A and 4B illustrate an example of an operation in which an electronic device displays a visual object in a user interface according to an embodiment. An electronic device 101 of FIGS. 4A and 4B may include the electronic device 101 of FIGS. 1 to 3.

Referring to FIG. 4A, the electronic device 101 according to an embodiment may display a user interface 405 for managing a plurality of files (e.g., a plurality of files 140 of FIG. 1) installed in the electronic device 101 on a display 150 in a state 400. For example, the user interface 405 may include icons 405-1 for classifying based on a format (or category) of a plurality of files, visual elements 405-2 (e.g., storage) for guiding a location of the plurality of files (or folders in which the plurality of files are stored), and a visual element 405-3 (e.g., flash) for providing a service for storing deleted files for a specified period. The user interface 405 may include a visual element 401 for displaying a first screen 415 for managing storage of memory. The first screen 415 may be referred to or analogous to a first screen 210 of FIG. 2.

For example, the electronic device 101 may enter a state 410 from the state 400 in response to an input to the visual element 401. In the state 410, the electronic device 101 may display the first screen 415 for managing a storage space (e.g., a storage space 135 of FIG. 1) of the memory (e.g., memory 130 of FIG. 1) on the display 150. The electronic device 101 may analyze a plurality of files (e.g., a plurality of files 140 of FIG. 1) stored in the memory based on entering the state 410. For example, an operation of analyzing a plurality of files by the electronic device 101 may include an operation of calculating the sizes of the plurality of files by the electronic device 101. While analyzing the plurality of files, the electronic device 101 may display a visual object 450 (e.g., a visual object indicating loading) indicating that the plurality of files are analyzed in an area 211. For example, while analyzing the plurality of files, the electronic device 101 may display a specified text (e.g., calculating) adjacent to each of text objects in an area 213 of FIG. 2. However, one or more embodiments are not limited thereto.

For example, the electronic device 101 may classify the plurality of files based on the format (or category) of each of the plurality of files. While classifying the plurality of files, the electronic device 101 may determine whether to generate visual objects (e.g., visual objects 301, 302, 303, 306, 307, 311, 316, 321, 326, and 331 of FIGS. 3A to 3C) to be displayed in the area 212. The electronic device 101 may identify whether groups of files corresponding to each of the visual objects satisfy a specified condition of each of the categories for forming the groups. When there is a file that satisfies the specified condition of each of the categories, the electronic device 101 may generate at least some of the visual objects corresponding to categories having the file that satisfies the specified condition. While generating the at least some of the visual objects, the electronic device 101 may display a visual object 451 indicating loading in the area 212. The visual object 451 may be displayed based on a progress circle shape. However, one or more embodiments are not limited thereto.

The electronic device 101 according to an embodiment may identify a variance of usage for each of categories 408 in a background state 406 to generate visual objects. The usage for each of the categories 408 may include a size of groups of files corresponding to the categories 408. The electronic device 101 may identify the variance of the usage for each of the categories 408 for a specified time (e.g., about 30 days). The electronic device 101 may identify the variance of the usage for each of the categories 408 based on an average storage 406-1 for the specified time. For example, the electronic device 101 may indicate the variance of the identified usage, as in a text object 409.

For example, the electronic device 101 may determine an order of visual objects to be displayed on the area 212 corresponding to each of the categories 408 according to an order in which the variance of the usage (or size) is large. The electronic device 101 may sort the categories 408 based on a descending order by identifying the variance of the usage for each of the categories 408. The order of the categories 408 sorted by using the descending order may indicate an order of visual objects corresponding to the categories 408 to be displayed on the area 212. For example, an order of a sixth category 325 of FIG. 3C may be disposed in the last order of the order of the categories 408, independent of the usage. However, one or more embodiments are not limited thereto. For example, an order of the visual objects to be displayed in the area 212 may be set in an order of visual objects 301, 302, and 303 corresponding to a first category 300 of FIG. 3A, visual objects 306 and 307 corresponding to a second category 305 of FIG. 3A, a visual object 311 corresponding to a third category 310 of FIG. 3B, a visual object 316 corresponding to a fourth category 315 of FIG. 3B, a visual object 321 corresponding to a fifth category 320 of FIG. 3B, a visual object 326 corresponding to a sixth category 325 of FIG. 3C, and a visual object 331 corresponding to a seventh category 330 of FIG. 3C.

Referring to FIG. 4B, the electronic device 101 according to an embodiment may enter a state 420 of FIG. 4B from the state 410 after analyzing sizes of the plurality of files stored in the memory. For example, the electronic device 101 may sequentially display visual objects in the area 212 of the first screen 415 in the state 420 based on the order of the categories 408 identified in the background state 406.

For example, the electronic device 101 may generate visual objects for some categories (e.g., categories 300, 305, 310, 315, 320, 325, and 330 of FIGS. 3A to 3C) having a file that satisfies a specified condition for each of the categories, among the categories. The electronic device 101 may display indicators 422 in the area 212 based on the number of visual objects for the generated categories. Each of the indicators 422 may be mapped to each of the visual objects. By using the indicators 422, the electronic device 101 may indicate the order of the visual objects.

For example, the electronic device 101 may display a first visual object 421 among the visual objects on the area 212 based on the order of the categories. While displaying the first visual object 421 on the area 212, the electronic device 101 may display, by visually highlighting, an indicator 422 corresponding to the first visual object 421. The first visual object 421 may refer to at least one category (e.g., the third category 310 of FIG. 3B) among the categories. The first visual object 421 may refer to the visual object 311 of FIG. 3B. The first visual object 421 may indicate a file related to capturing a software application.

The electronic device 101 according to an embodiment may temporarily refrain from displaying at least one display among the visual objects. For example, the electronic device 101 may identify an input (or selection) for at least one of text objects 340 and 350 included in the first visual object 421. In response to an input to the text object 340, the electronic device 101 may display a screen (e.g., a screen 515 of FIG. 5) including a list of files corresponding to the first visual object 421 on the display 150. After displaying the screen, the electronic device 101 may identify an input indicating display of the first screen 415. The electronic device 101 may enter a state 430 based on identifying the input.

For example, the input for the electronic device 101 to enter the state 430 is not limited to the input indicating the display of the first screen 415 after displaying a screen including the list of files corresponding to the first visual object 421. The electronic device 101 may enter the state 430 in response to an input to a text object 350.

For example, in the state 430, the electronic device 101 may display the first screen 415 on the display 150 based on identifying the input indicating the display of the first screen 415. Based on displaying the first screen 415 on the display 150, the electronic device 101 may refrain from displaying the first visual object 421 and the indicator corresponding to the first visual object 421. Since the electronic device 101 provided the user with the list of files corresponding to the first visual object 421, the electronic device 101 may temporarily refrain from displaying the first visual object 421. Since display of the first visual object and the indicator corresponding to the first visual object is refrained, in the state 430, the number (e.g., six) of the indicators 432 may be less than the number (e.g., seven) of the indicators 422. The electronic device 101 may display the second visual object 431 in the area 212, based on temporarily refraining from displaying the first visual object 421. An order of the second visual object 431 may be next to an order of the first visual object 421. The second visual object 431 may correspond to a second category distinct to a first category corresponding to the first visual object 421.

As described above, the electronic device 101 according to an embodiment may sequentially display visual objects of each of the categories 408 in the area 212 of the first screen 415 for managing the memory based on the order of the categories 408. The electronic device 101 may provide a service capable of more efficiently managing the capacity of the memory to a user based on displaying the visual objects in the area 212. Hereinafter, an example of an operation of identifying an input indicating that the electronic device 101 switches from a second screen 515 including a list of the plurality of files to the first screen 415 will be described with reference to FIG. 5, according to an embodiment.

Figure 5:
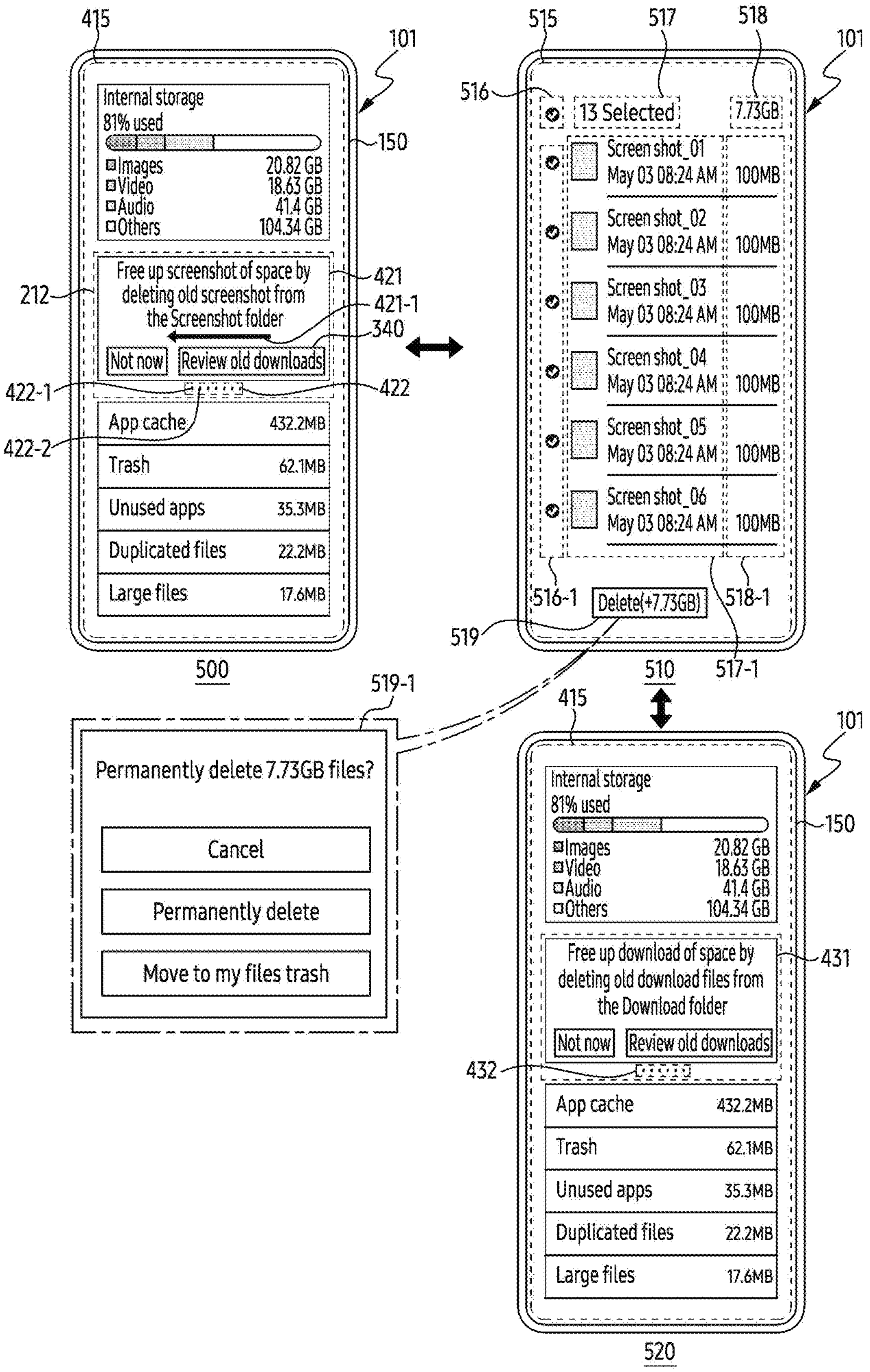
FIG. 5 illustrates an example of a screen including a list of files corresponding to a category according to an embodiment.

FIG. 5 illustrates an example of a screen including a list of files corresponding to a category according to an embodiment. An electronic device 101 of FIG. 5 may include the electronic device 101 of FIGS. 1 to 4B. A state 500 may be referred to or analogous to a state 420 of FIG. 4B.

In the state 500 according to an embodiment, the electronic device 101 may identify a swipe input based on a direction 421-1 while displaying a first visual object 421 in a scrollable area 212. Based on identifying the swipe input, the electronic device 101 may display a second visual object 431 having an order that is next to an order of the first visual object 421 in the area 212. The electronic device 101 may display, by visually highlighting, an indicator 422-2 (or the indicator 422-2 indicating an order of the second visual object 431) corresponding to the second visual object 431, based on displaying the second visual object 431 in the area 212 in response to identifying a swipe input. For example, in the case of identifying a swipe input based on a direction opposite to the direction 421-1, the electronic device 101 may change the display of/from the second visual object 431 to the display of the first visual object 421. The electronic device 101 may display, by visually highlighting, the indicator 421-1 together with the display of the first visual object 421.

For example, the electronic device 101 may identify an input to a text object 340 in the state 500. The electronic device 101 may enter the state 510 from the state 500 based on identifying the input to the text object 340.

For example, in the state 510, the electronic device 101 may display a second screen 515 including a list of one or more first files (e.g., one or more first files 141 of FIG. 1) corresponding to the first visual object 421 on a display 150. The one or more first files may include files that satisfy a specified condition of a category corresponding to the first visual object 421.

For example, the second screen 515 may include a visual element 516 for selecting (or releasing) all of the one or more first files, a text 517 indicating the number of the one or more first files, and/or a full size 518 of the one or more first files. The second screen 515 may include one or more first files 517-1, a size 518-1 of each of the one or more first files 517-1 and/or visual elements 516-1 for selecting each of the one or more first files 517-1. The second screen 515 may include a visual element 519 for removing one or more selected first files. The visual element 519 may include text indicating a size of the one or more first files to be deleted. The visual element 519 may include text indicating the number of the one or more first files. However, one or more embodiments are not limited thereto. The electronic device 101 may identify an input to the visual element 519 of the second screen 515. The electronic device 101 may display a pop-up screen 519-1 by overlapping at least a portion of the second screen 515, based on identifying the input to the visual element 519. The pop-up screen 519-1 may include a text object indicating cancellation of deletion (or removal), a text object for permanent deletion in memory, and/or a text object indicating movement to a folder (e.g., a trash bin) for storing one or more first files 516-1 for a specified period.

For example, while displaying the second screen 515, the electronic device 101 may receive an input (e.g., an input for the visual element 519) indicating deletion of the one or more first files 517-1 or may receive an input indicating movement from the display of the second screen 515 to the display of the first screen (e.g., a back input). For example, the electronic device 101 may enter a state 520 based on receiving the input. The state 520 may be referred to or analogous to a state 430 of FIG. 4B.

As described above, the electronic device 101 according to an embodiment may recommend deletable files corresponding to the visual objects to the user, based on sequentially displaying the visual objects within the scrollable area 212 of a first screen 415. In response to an input to any one visual object (e.g., the first visual object 421) among the visual objects, the electronic device 101 may display the second screen 515 including a list of files corresponding to any one visual object among the deletable files on the display 150. By using the second screen 515, the electronic device 101 may provide a user interface capable of more easily deleting deletable files classified by using categories.

Figure 6:
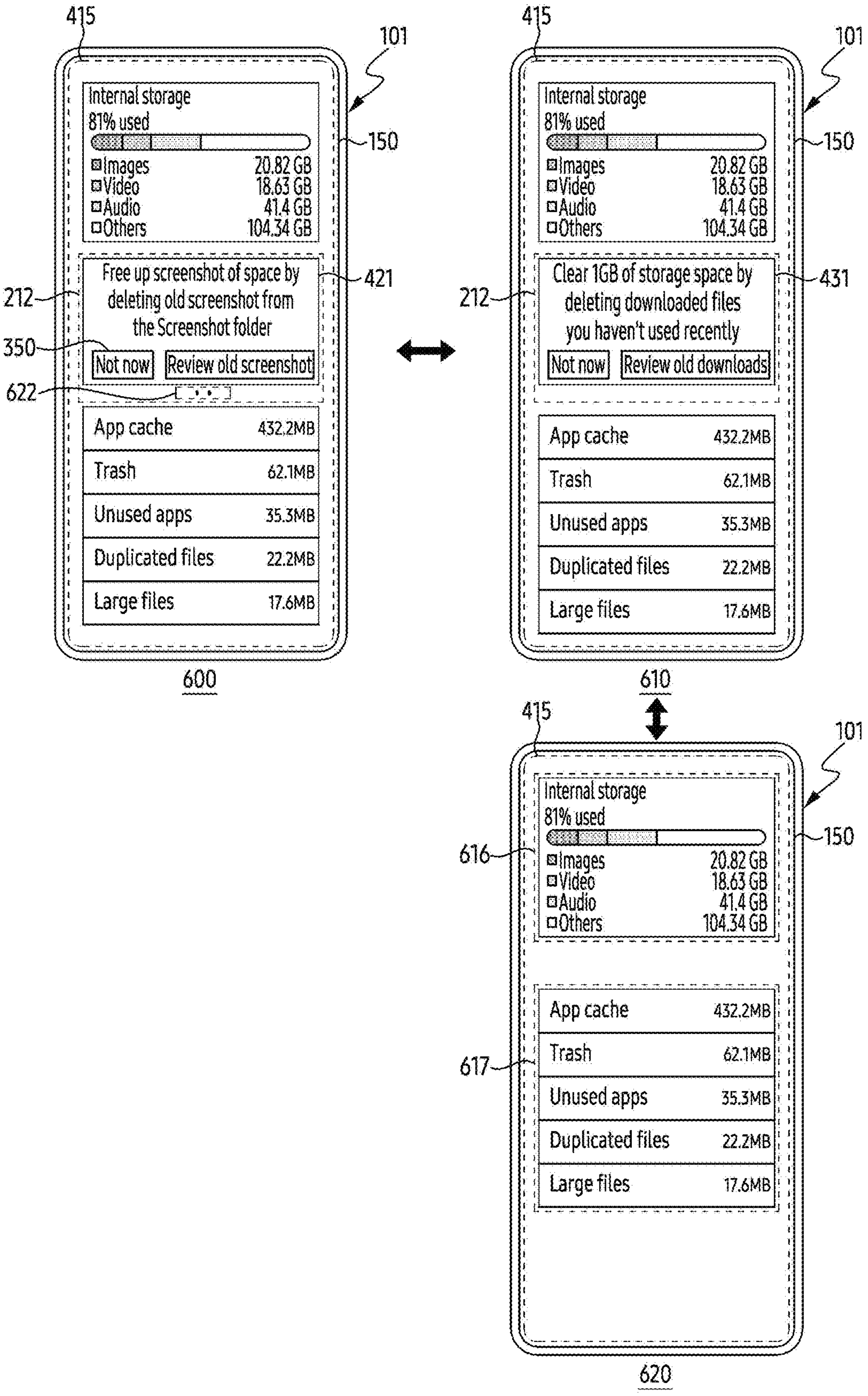
FIG. 6 illustrates an example of an operation in which an electronic device refrains from displaying a visual object according to an embodiment.

FIG. 6 illustrates an example of an operation in which an electronic device refrains from displaying a visual object according to an embodiment. An electronic device 101 of FIG. 6 may include the electronic device 101 of FIGS. 1 to 5. Referring to FIG. 6, a state 600 may be included in a state 420 of FIG. 4B.

The electronic device 101 according to an embodiment may sequentially display two visual objects in an area 212 in the state 600. The electronic device 101 may display indicators 622 in the area 212 according to the number of visual objects.

For example, the electronic device 101 may receive an input for a text object 350 while displaying the first visual object 421 in the area 212. The electronic device 101 may temporarily refrain from displaying the first visual object 421, based on reception of an input to the text object 350. The electronic device 101 may enter a state 610 based on temporarily refraining from displaying the first visual object 421.

For example, in the state 610, the electronic device 101 may display a second visual object 431 in the area 212. The electronic device 101 may temporarily refrain from displaying an indicator indicating an order of the visual objects based on identifying the number (e.g., one) of the visual objects (e.g., the second visual object 431) to be displayed in the area. The electronic device 101 may identify the input to the text object 350 while displaying the second visual object 431. The electronic device 101 may temporarily refrain from displaying the second visual object 431 based on the identification of the input to the text object 350. Based on temporarily refraining from displaying the second visual object 431 within the area 212, the electronic device 101 may exclude the area 212 in which visual objects obtained based on categories are to be displayed within a first screen 415. By excluding the area 212, the electronic device 101 may enter a state 620.

For example, in the state 620, the electronic device 101 may display the first screen 415 excluding the area 212 on a display 150. As the area 212 is excluded, a size of an area 616 and an area 617 may increase based on a size of the first screen 415. The area 616 may be referred to as and/or analogous to an area 211. The area 617 may be referred to as and/or analogous to an area 213. The size of the area 616 may be larger than a size of the area 211. The size of the area 617 may be larger than a size of the area 213. For example, a size of visual objects included in the area 616 may increase. The number of text objects (e.g., text objects 230 and 231 of FIG. 2) included in the area 616 may increase. However, one or more embodiments are not limited thereto.

The electronic device 101 according to an embodiment may identify an input for temporarily refraining from displaying the first screen 415. The electronic device 101 may display another screen distinct to the first screen 415 on the display based on identifying the input. The other screen may include a home screen provided by the operating system. The other screen may include a user interface 405 of FIG. 4A. After displaying the other screen, the electronic device 101 may identify another input indicating the display of the first screen 415. The electronic device 101 may enter a state 410 of FIG. 4A based on identifying the other input.

Figure 7:
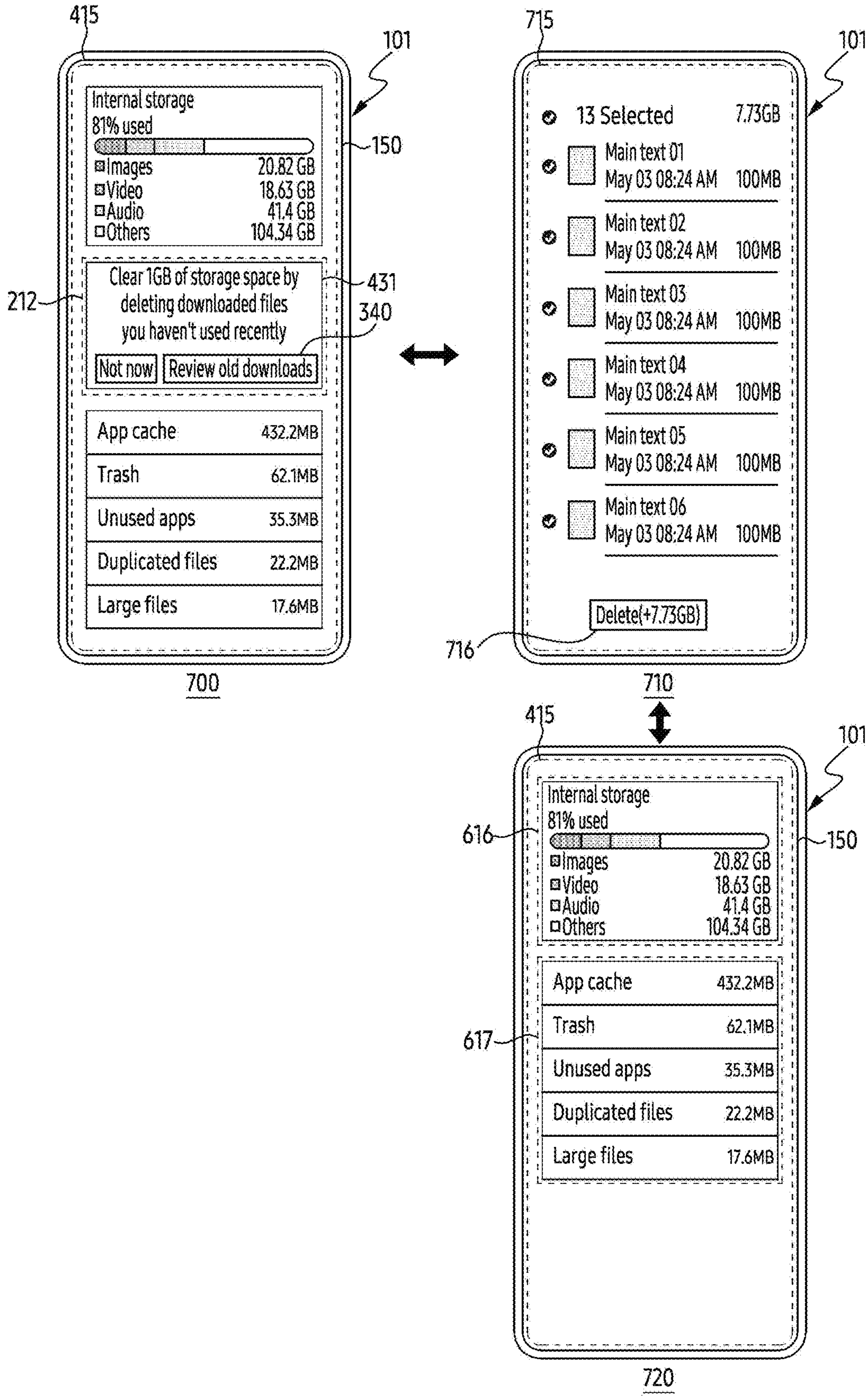
FIG. 7 illustrates an example of an operation in which an electronic device refrains from displaying a visual object according to an embodiment.

FIG. 7 illustrates an example of an operation in which an electronic device refrains from displaying a visual object according to an embodiment. Referring to FIG. 7, a state 700 may be referred to as and/or analogous to a state 610 of FIG. 6.

The electronic device 101 according to an embodiment may identify an input to a text object 340 in the state 700. The electronic device 101 may enter a state 710 based on identification of the input to the text object 340.

For example, in the state 710, the electronic device 101 may display a second screen 715 including a list of one or more files classified by a category (e.g., a fourth category 415 of FIG. 3B) corresponding to a second visual object 431, on the display 150. Among a description of the second screen 715, a description overlapping with a description of a second screen 515 of FIG. 5 may be omitted. For example, the list of the one or more files may include files that are in the same file path, have the same type, and have been generated after a specified date.

For example, the electronic device 101 may identify an input to a visual element 716 for deleting the one or more files. The electronic device 101 may display a pop-up screen 519-1 of FIG. 5 by overlapping the second screen 715, based on identifying the input to the visual element 716. The electronic device 101 may delete the one or more files displayed on the second screen 715 by using the pop-up screen 519-1. The electronic device 101 may enter a state 720 from the state 710 based on deleting the one or more files. For example, the electronic device 101 may enter the state 720 from the state 710 in response to a user input (e.g., a backward input) to enter the state 720 after deleting the one or more files. In the case that all of the one or more files are deleted, the electronic device 101 may display a screen including specified text (e.g., no files) and may enter the state 720 in response to the user input while displaying the screen. For example, the state 720 may be referred to as and/or analogous to a state 620 of FIG. 6.

Although not illustrated, the electronic device 101 according to an embodiment may initiate analysis of a size of a plurality of files installed in the memory because one or more files have been deleted from the memory, based on entering the state 720. The electronic device 101 may identify a storage space, a used space, and/or a free space of the memory. After deleting the one or more files in the memory, the electronic device 101 may display by changing at least some of a visual element (e.g., a visual element 232 of FIG. 2) and/or text objects (e.g., text objects 231 of FIG. 2), based on a ratio for the storage space, the used space, and/or the free space of the identified memory.

As described above, the electronic device 101 according to an embodiment may identify the plurality of files installed in the memory by using categories in order to secure or increase the storage space in the memory. The electronic device 101 may identify one or more first files that satisfy a specified condition of each of the categories among the plurality of files. The electronic device 101 may generate visual objects recommending deletion of one or more first files for each of the categories. The electronic device 101 may sequentially display the generated visual objects, by using an order obtained based on a variance of a size of files corresponding to the categories. The electronic device 101 may reduce the used space of the memory, by deleting the one or more first files based on an input to each of the visual objects.

Figure 8:
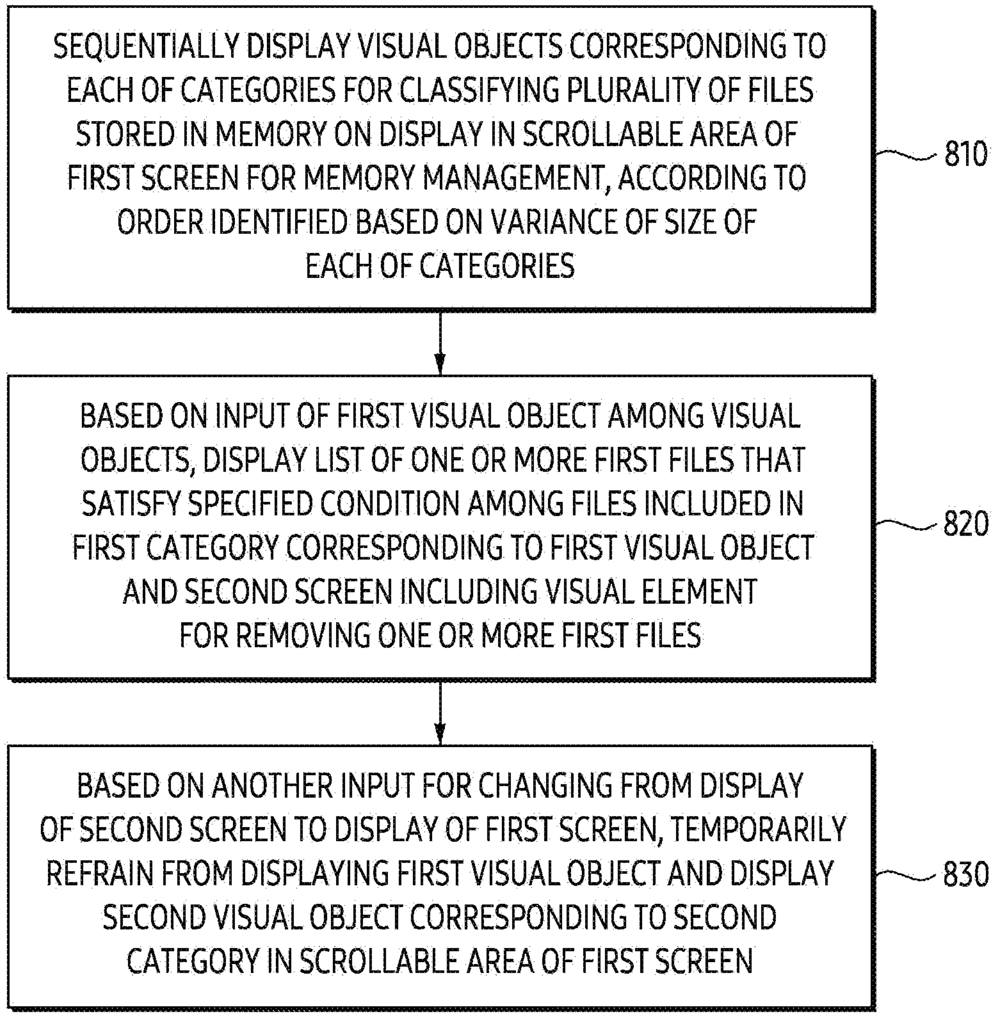
FIG. 8 illustrates an example of a flowchart indicating an operation of an electronic device according to an embodiment.

FIG. 8 illustrates an example of a flowchart indicating an operation of an electronic device according to an embodiment. The electronic device of FIG. 8 may include an electronic device 101 of FIGS. 1 to 7. At least one of operations of FIG. 8 may be performed by the electronic device 101 of FIG. 1. At least one of the operations of FIG. 8 may be controlled by a processor 120 of FIG. 1. Each of the operations of FIG. 8 may be performed in sequence, but is not necessarily performed in sequence. For example, an order of each of the operations may be changed, and at least two operations may be performed in parallel.

Referring to FIG. 8, in operation 810 according to an embodiment, the processor may sequentially display visual objects corresponding to each of the categories for classifying a plurality of files stored in the memory on the display in a scrollable area of a first screen for memory management, according to an order identified based on the variance of a size of each of the categories. For example, the first screen may be referred to a first screen 210 of FIG. 2. The scrollable area may be referred to as and/or analogous to an area 212 of FIG. 2. The categories may include categories 300, 305, 310, 315, 320, 325, and 330 of FIGS. 3A to 3C. The visual objects may include visual objects 301, 302, 303, 306, 307, 311, 316, 321, 326, 331, 370, and 380 of FIGS. 3A to 3D. The categories may form groups of the plurality of files stored in the memory. The variance of the size of each of the categories may include a variance of a sizes of groups corresponding to the plurality of files. In the case that there is a file that satisfies a specified condition of each of the categories among the plurality of files, the processor may generate a visual object indicating a category having the file that satisfies the specified condition.

The processor may identify the variance of a size of the groups of the plurality of files based on a descending order, for example, from a larger size to a smaller size. The processor may sequentially display visual objects in the area along with indicators indicating the order according to the order identified based on the variance.

Referring to FIG. 8, in operation 820 according to an embodiment, based on an input and/or selection of a first visual object among visual objects, the processor may display a list of one or more first files that satisfy a specified condition among files included in a first category corresponding to the first visual object and a second screen including a visual element for removing one or more first files. The processor may identify an input to a text object 340 among the text object 340 and a text object 350 included in the first visual object (e.g., a first visual object 421 of FIG. 4B). The processor may display the second screen (e.g., a second screen 515 of FIG. 5) on the display based on identification of the input. The visual element may be referred to as and/or analogous to a visual element 519 of FIG. 5.

Referring to FIG. 8, in operation 830, according to an embodiment, based on another input for changing from the display of the second screen to the display of the first screen, the processor may temporarily refrain from displaying the first visual object and may display a second visual object corresponding to a second category in a scrollable area of the first screen. The other input for changing to the display of the first screen may include an input for the visual element. The other input for changing to the display of the first screen may include an input for a back button. The processor may infer that the user checks the list of the one or more first files, for example, based on identifying the input for the back button. Based on the inference, the processor may temporarily refrain from displaying the first visual object. By temporarily refraining from displaying the first visual object, it is possible to refrain from displaying the indicator corresponding to the first visual object together. As the processor refrains from displaying the indicator, the number of indicators displayed in an area (e.g., the area 212 of FIG. 2) may be reduced. The processor may display, by visually highlighting, an indicator indicating an order of the second visual object based on displaying the second visual object.

Figure 9:
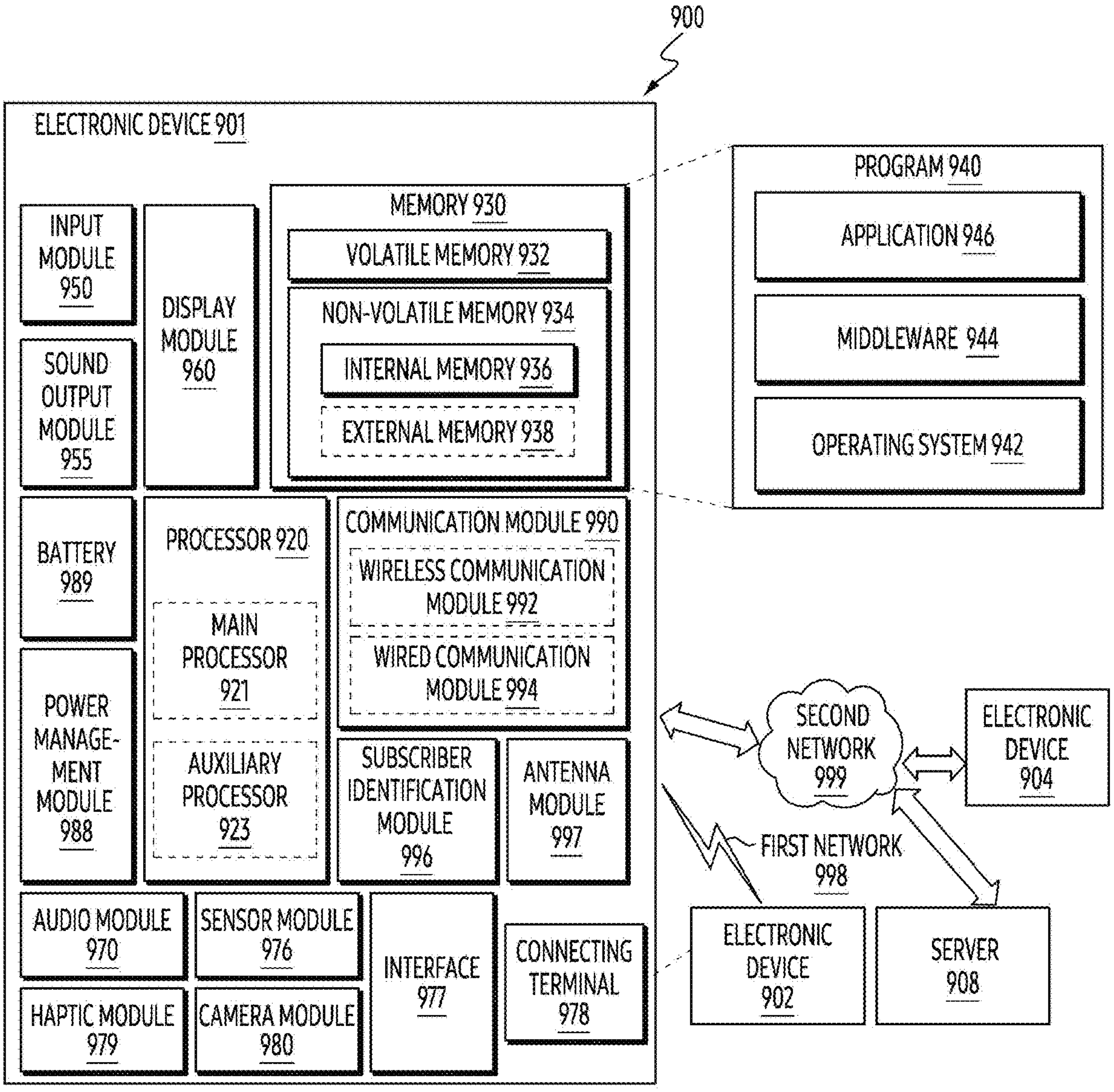
FIG. 9 is a block diagram of an electronic device in a network environment according to various embodiments.

FIG. 9 is a block diagram illustrating an electronic device 901 in a network environment 900 according to various embodiments. Referring to FIG. 9, the electronic device 901 in the network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mm Wave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 964 dB or less) for implementing mMTC, or U-plane latency (e.g., 0.5 ms or less for each of downlink (DL) and uplink (UL), or a round trip of 9 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

The electronic device 101 of FIG. 9 may be referred to the electronic device 101 of FIG. 1.

The electronic device according to an embodiment may provide a user interface for reducing a usage capacity in memory. The electronic device may use categories for classifying a plurality of files in the memory in order to reduce the usage capacity in the memory. The electronic device may obtain a visual object for deleting one or more files that satisfy specified conditions among a plurality of files classified by using categories. The electronic device may delete files classified for each category from the memory by using visual objects.

As described above, in an electronic device 101 according to an embodiment, the electronic device may include a display 150, a memory 130 comprising one or more storage mediums and storing instructions, and at least one processor 120 comprising processing circuitry. The instructions, when executed by the at least one processor individually or collectively, may cause the electronic device to display a first visual object 421 among visual objects 301, 302, 303, 306, 307, 311, 316, 321, 326, and 331 arranged according to an order of variance of sizes of the groups corresponding to a plurality of files, in an area of a first screen for managing the memory. The visual objects are respectively corresponding to the groups of the plurality of files stored in the memory. The instructions, when executed by the at least one processor individually or collectively, may cause the electronic device to, based on an input of the first visual object, display a second screen 515 and 715 including a list of first files 141 and 517-1 corresponding to a specified condition of a first group corresponding to the first visual object and a visual element 519 and 716 for removal of the first files.

For example, the groups may be formed by categories for classifying the plurality of files stored in the memory. The instructions, when executed by the at least one processor individually or collectively, may cause the electronic device to temporarily refrain from a display of the first visual object and display a second visual object 431 corresponding to a second category 315 distinct to a first category 310 corresponding to the any one group in the scrollable area of the first screen, based on another input for changing from the display of the second screen to the display of the first screen.

For example, the instructions, when executed by the at least one processor individually or collectively, may cause the electronic device to display the second screen based on the input for a first text object among the first text object 340 for displaying the first files and a second text object 350 for at least temporarily refraining from the display of the first visual object, using the first visual object.

For example, the instructions, when executed by the at least one processor individually or collectively, may cause the electronic device to identify the variance of the sizes of the groups for a specified time, based on another input indicating display of the first screen, to display the visual objects in the scrollable area of the first screen. When the instructions are executed, the processor may be configured to arrange the visual objects corresponding to each of the categories according to order of decreasing the variance of the sizes in the scrollable area.

For example, the instructions, when executed by the at least one processor individually or collectively, may cause the electronic device to display indicators 422 and 432 indicating the order of visual objects in the area, based on number of the visual objects.

For example, the instructions, when executed by the at least one processor individually or collectively, may cause the electronic device to display, by visually highlighting, a first indicator 422-1 indicating an order of the first visual object among the indicators, while displaying the first visual object in the area. The instructions, when executed by the at least one processor individually or collectively, may cause the electronic device to change from the display of the first visual object to a display of the second visual object corresponding to the second category based on a swipe input for the first visual object displayed in the area. The instructions, when executed by the at least one processor individually or collectively, may cause the electronic device to display, by visually highlighting, a second indicator 422-2 indicating an order of the second visual object, based on the display of the second visual object on the area.

For example, the instructions, when executed by the at least one processor individually or collectively, may cause the electronic device to temporarily refrain from displaying of the first visual object based the other input for changing to the display of the first screen. The instructions, when executed by the at least one processor individually or collectively, may cause the electronic device to temporarily refrain from displaying the first indicator based on temporarily refraining from displaying of the first visual object.

For example, the instructions, when executed by the at least one processor individually or collectively, may cause the electronic device to identify at least one file with the longest time stored in the memory, among files included in the first category corresponding to the first visual object. The instructions, when executed by the at least one processor individually or collectively, may cause the electronic device to identify the first files having a format of the at least one file.

In a method of an electronic device according to an embodiment as described above, the method may comprise displaying a first visual object 421 among visual objects 301, 302, 303, 306, 307, 311, 316, 321, 326, and 331 arranged according to an order of variance of sizes of the groups corresponding to a plurality of files, in an area of a first screen for managing memory 130. The visual objects are respectively corresponding to the groups of the plurality of files stored in the memory. The method may comprise, based on an input of the first visual object, displaying a second screen 515 and 715 including a list of first files 141 and 517-1 corresponding to a specified condition of a first group corresponding to the first visual object and a visual element 519 and 716 for removal of the first files.

For example, the groups may be formed by categories for classifying the plurality of files stored in the memory. The method may comprise temporarily refraining from a display of the first visual object and displaying a second visual object 431 corresponding to a second category 315 distinct to a first category 310 corresponding to the any one group in the scrollable area of the first screen, based on another input for changing from the display of the second screen to the display of the first screen.

For example, the method may comprise displaying the second screen based on the input for a first text object among the first text object 340 for displaying the first files and a second text object 350 for at least temporarily refraining from display of the first visual object, using the first visual object.

For example, the displaying the visual objects on the scrollable area of the first screen may comprise identifying the variance of the size of the groups for a specified time, based on another input indicating a display of the first screen. The displaying the visual objects on the scrollable area of the first screen may further comprise arranging the visual objects corresponding to each of the categories according to order of decreasing the variance of the sizes, on the scrollable area.

For example, the method may comprise displaying indicators 422 and 432 indicating the order of visual objects in the area, based on number of the visual objects.

For example, the method may comprise displaying, by visually highlighting, a first indicator 422-1 indicating an order of the first visual object among the indicators, while displaying the first visual object in the area. The method may comprise changing from the display of the first visual object to a display of the second visual object corresponding to the second category based on a swipe input for the first visual object displayed in the area. The method may comprise displaying, by visually highlighting, a second indicator 422-2 indicating an order of the second visual object, based on the display of the second visual object on the area.

For example, the method may comprise identifying at least one file with the longest time stored in the memory, among files included in the first category corresponding to the first visual object. The method may comprise identifying the one or more first files having a format of the at least one file.

In a computer-readable storage medium storing one or more programs according to an embodiment as described above, the one or more programs, when executed by a processor of the electronic device, may be configured to cause the electronic device to display a first visual object 421 among visual objects 301, 302, 303, 306, 307, 311, 316, 321, 326, and 331 arranged according to an order of variance of the sizes of groups corresponding to a plurality of files in an area of the first screen for managing the memory 130. The visual objects may respectively correspond to the groups of the plurality of files stored in the memory. The one or more programs, when executed by a processor of the electronic device, may be configured to cause the electronic device to, based on an input of the first visual object, display a second screen 515 and 715 including a list of first files 141 and 517-1 corresponding to a specified condition of a first group corresponding to the first visual object and a visual element 519 and 716 for removal of the first files.

For example, the groups are formed by categories for classifying the plurality of files stored in the memory. The one or more programs, when executed by the processor of the electronic device, may be configured to cause the electronic device to temporarily refrain from a display of the first visual object and display a second visual object 431 corresponding to a second category 315 distinct to a first category 310 corresponding to the any one group in the scrollable area of the first screen, based on another input for changing from the display of the second screen to the display of the first screen.

For example, the one or more programs, when executed by the processor of the electronic device, may be configured to cause the electronic device to display the second screen based on the input for a first text object among the first text object 340 for displaying the first files and a second text object 350 for at least temporarily refraining from the display of the first visual object, using the first visual object.

For example, the one or more programs, when executed by the processor of the electronic device, may be configured to cause the electronic device to identify the variance of the sizes of the groups for a specified time, based on another input indicating display of the first screen, to display the visual objects in the scrollable area of the first screen. The one or more programs, when executed by the processor of the electronic device, may be configured to cause the electronic device to arrange the visual objects corresponding to each of the categories according to order of decreasing the variance of the sizes in the scrollable area.

For example, the one or more programs, when executed by the processor of the electronic device, may be configured to cause the electronic device to display indicators 422 and 432 indicating an order of visual objects in the area, based on number of the visual objects.

In an electronic device according to an embodiment as described above, the electronic device may include a display 150, memory 130 comprising one or more storage mediums and storing instructions, and at least one processor 120 comprising processing circuitry. The instructions, when executed by the at least one processor individually or collectively, may cause the electronic device to display a first visual object 421 among visual objects 301, 302, 303, 306, 307, 311, 316, 321, 326, and 331 for a plurality of files, in an area of a first screen for managing the memory. The visual objects may respectively correspond to the groups of the plurality of files stored in the memory and include the first visual object for a file related to installation of software application and a second visual object for a file related to capturing a screen of the electronic device. The instructions, when executed by the at least one processor individually or collectively, may cause the electronic device to display a second screen 515 and 715 including a visual element 519 and 716 for deleting the first files and a list of the first files 141 and 517-1 that are in the same file path as the file related to the installation corresponding to the first visual object, have the same type as the file related to the installation, and have been created after a specified date, based on the input to the first visual object.

For example, the groups may be formed by categories for classifying the plurality of files stored in the memory. When the instructions are executed, the processor may be configured to temporarily refrain from a display of the first visual object and display a second visual object corresponding to a second category 315 distinct to a first category 310 corresponding to the first files in the scrollable area of the first screen, based on another input for changing from the display of the second screen to the display of the first screen.

For example, the instructions, when executed by the at least one processor individually or collectively, may cause the electronic device to display the second screen based on the input for the first text object among the first text object 340 for displaying the first files and a second text object 350 for at least temporarily refraining from the display of the first visual object, using the first visual object.

For example, the instructions, when executed by the at least one processor individually or collectively, may cause the electronic device to identify the variance of the sizes of the groups for a specified time, based on the other input indicating display of the first screen, to display the visual objects in the scrollable area of the first screen. The instructions, when executed by the at least one processor individually or collectively, may cause the electronic device to arrange the visual objects corresponding to each of the categories according to order of decreasing the variance of the sizes in the scrollable area.

For example, the instructions, when executed by the at least one processor individually or collectively, may cause the electronic device to display indicators 422 and 432 indicating the order of the visual objects in the area, based on number of the visual objects.

In a method of an electronic device according to an embodiment as described above, the method may comprise displaying a first visual object 421 among visual objects 301, 302, 303, 306, 307, 311, 316, 321, 326, and 331 for a plurality of files, in an area of a first screen for managing memory 130. The visual objects may respectively correspond to the groups of the plurality of files stored in the memory and include the first visual object for a file related to installation of software application and a second visual object for a file related to capturing a screen of the electronic device. The method may comprise displaying a second screen 515 and 715 including a visual element 519 and 716 for deleting the first files and a list of the first files 141 and 517-1 that are in the same file path as the file related to the installation corresponding to the first visual object, have the same type as the file related to the installation, and have been created after a specified date, based on the input to the first visual object.

In a computer-readable storage medium storing one or more programs according to an embodiment as described above, the one or more programs, when executed by a processor of the electronic device, may be configured to cause the electronic device to display a first visual object 421 among visual objects 301, 302, 303, 306, 307, 311, 316, 321, 326, and 331 for a plurality of files in an area of the first screen for managing the memory 130. The visual objects may respectively correspond to the groups of the plurality of files stored in the memory and include the first visual object for a file related to installation of software application and a second visual object for a file related to capturing a screen of the electronic device. The one or more programs, when executed by a processor of the electronic device, may be configured to cause the electronic device to display a second screen 515 and 715 including a visual element 519 and 716 for deleting the first files and a list of the first files 141 and 517-1 that are in the same file path as the file related to the installation corresponding to the first visual object, have the same type as the file related to the installation, and have been created after a specified date, based on the input to the first visual object.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device; comprising:

a display;

at least one processor comprising processing circuitry; and memory comprising one or more storage mediums storing instructions, wherein the instructions, when executed by the at least one processor individually or collectively, cause the electronic device to:

identify file groups to which files stored in the memory are classified;

identify a rate of change regarding increasing of sizes of the file groups;

display visual objects arranged according to an order of the rate of change in an area of a first screen on the display for managing the memory, wherein the visual objects are respectively corresponding to the file groups, and based on an input of a first visual object among the visual objects:

identify first files included in a file group corresponding to the first visual object;

determine whether each of the first files satisfy a preset condition for removal; and display, on the display, a second screen including a list of at least one of the first files which satisfy the preset condition and including at least one visual element for removal of a corresponding file.

2. The electronic device of claim 1, wherein the file groups are formed by categories for classifying a plurality of files stored in the memory, and wherein the instructions, when executed by the at least one processor individually or collectively, cause the electronic device to:

temporarily refrain from displaying the first visual object and display a second visual object corresponding to another file group in a scrollable area of the first screen, based on another input for changing from displaying the second screen to displaying the first screen.

3. The electronic device of claim 2, wherein the instructions, when executed by the at least one processor individually or collectively, cause the electronic device to:

display the second screen based on the input for a first text object among the first text object for displaying the first files and a second text object for at least temporarily refraining from displaying the first visual object, in response to using the first visual object.

4. The electronic device of claim 2,
wherein the instructions, when executed by the at least one processor individually or collectively, cause the electronic device to:
identify the rate of change regarding increasing the sizes of the file groups for a specified time, based on the another input indicating to display the first screen, and
arrange the visual objects corresponding to each of the categories according to a descending order of the rate of change of the sizes in the scrollable area, to display the visual objects in the scrollable area of the first screen.

5. The electronic device of claim 2,
wherein the instructions, when executed by the at least one processor individually or collectively, cause the electronic device to:
display indicators indicating the order of the visual objects in the area, based on a number of the visual objects.

6. The electronic device of claim 5,
wherein the instructions, when executed by the at least one processor individually or collectively, cause the electronic device to:
display, by visually highlighting, a first indicator indicating an order of the first visual object among the indicators, while displaying the first visual object in the area,
change from displaying the first visual object to displaying the second visual object corresponding to another file group based on a swipe input for the first visual object displayed in the area, and
display, by visually highlighting, a second indicator indicating an order of the second visual object, based on displaying the second visual object on the area.

7. The electronic device of claim 6,
wherein the instructions, when executed by the at least one processor individually or collectively, cause the electronic device to:
temporarily refrain from displaying of the first visual object based on the another input for changing to displaying of the first screen, and
temporarily refrain from displaying the first indicator based on temporarily refraining from displaying of the first visual object.

8. The electronic device of claim 2,
wherein the instructions, when executed by the at least one processor individually or collectively, cause the electronic device to:
identify at least one file with a longest time stored in the memory, among the first files included in the file group corresponding to the first visual object, and
identify the first files having a format of the at least one file.

9. A method of an electronic device, the method comprising:
identifying file groups to which files stored in memory are classified;
identifying a rate of change regarding increasing of sizes of the file groups;
displaying visual objects arranged according to an order of the rate of change in an area of a first screen for managing the memory, wherein the visual objects are respectively corresponding to the file groups, and
based on an input of a first visual object among the visual objects:
identifying first files included in a file group corresponding to the first visual object;
determining whether each of the first files satisfy a preset condition for removal; and
displaying a second screen including a list of at least one of the first files which satisfy the preset condition and including at least one visual element for removal of a corresponding file.

10. The method of the electronic device of claim 9, wherein the file groups are formed by categories for classifying a plurality of files stored in the memory, and
the method comprising:
temporarily refraining from displaying the first visual object and displaying a second visual object corresponding to another file group in a scrollable area of the first screen, based on another input for changing from displaying the second screen to displaying the first screen.

11. The method of the electronic device of claim 10, comprising:
displaying the second screen based on the input for a first text object among the first text object for displaying the first files and a second text object for at least temporarily refraining from displaying the first visual object, in response to using the first visual object.

12. The method of claim 10, further comprising:
identifying the rate of change regarding increasing the sizes of the file groups for a specified time, based on another input indicating to display the first screen, the file groups being formed by categories for classifying the plurality of files stored in the memory, and
arranging the visual objects corresponding to each of the categories according to a descending order of the rate of change of the sizes, on the scrollable area.

13. The method of claim 10, comprising:
displaying indicators indicating the order of the visual objects in the area, based on a number of the visual objects.

14. The method of claim 13, comprising:
displaying, by visually highlighting, a first indicator indicating an order of the first visual object among the indicators, while displaying the first visual object in the area,
changing from displaying the first visual object to displaying the second visual object corresponding to another file group based on a swipe input for the first visual object displayed in the area, and
displaying, by visually highlighting, a second indicator indicating an order of the second visual object, based on displaying the second visual object on the area.

15. The method of claim 10, comprising:
identifying at least one file with a longest time stored in the memory, among the first files included in the file group corresponding to the first visual object, and
identifying the first files having a format of the at least one file.

16. An electronic device, comprising:
a display;
at least one processor comprising processing circuitry; and
memory comprising one or more storage mediums storing instructions,
wherein the instructions, when executed by the at least one processor individually or collectively, cause the electronic device to:
display a first visual object of visual objects of a plurality of files in an area of a first screen on the display for managing the memory, wherein the visual objects respectively correspond to file groups of the plurality of files stored in the memory, wherein the visual objects include the first visual object for a file related to installation of a software application and a second visual object for another file related to capturing a screen of the electronic device; and display, on the display, a second screen including a visual element for deleting first files and a list of the first files that: are in a same file path as the file related to the installation corresponding to the first visual object, have a same type as the file related to the installation, and have been created after a specified date, based on the input to the first visual object, wherein the visual objects are arranged in the first screen according to a rate of change regarding increasing of sizes of the file groups.

17. The electronic device of claim 16, wherein the file groups are formed by categories for classifying the plurality of files stored in the memory, and wherein the instructions, when executed by the at least one processor individually or collectively, cause the electronic device to:

temporarily refrain from displaying the first visual object corresponding to a first category and display the second visual object corresponding to a second category distinct to the first category corresponding to the first files in a scrollable area of the first screen, based on another input for changing from displaying the second screen to displaying the first screen.

18. The electronic device of claim 17, wherein the instructions, when executed by the at least one processor individually or collectively, cause the electronic device to:

display the second screen based on another input for a first text object among the first text object for displaying the first files and a second text object for at least temporarily refraining from displaying the first visual object, in response to using the first visual object.

19. The electronic device of claim 17, wherein the instructions, when executed by the at least one processor individually or collectively, cause the electronic device to:

identify a rate of change of the sizes of the file groups for a specified time, based on the another input indicating to display the first screen, and arrange the visual objects corresponding to each of the categories according to an order of decreasing the rate of change of the sizes in the scrollable area.

20. The electronic device of claim 17, wherein the instructions, when executed by the at least one processor individually or collectively, cause the electronic device to:

display indicators indicating an order of the visual objects in the area, based on a number of the visual objects.

* * * * *